US012028568B2

(12) United States Patent
Karazoun

(10) Patent No.: US 12,028,568 B2
(45) Date of Patent: Jul. 2, 2024

(54) METHODS AND APPARATUS TO IDENTIFY MEDIA APPLICATION SESSIONS

(71) Applicant: The Nielsen Company (US), LLC, New York, NY (US)

(72) Inventor: Khaldun Karazoun, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/227,195

(22) Filed: Apr. 9, 2021

(65) Prior Publication Data

US 2022/0329893 A1 Oct. 13, 2022

(51) Int. Cl.
*H04N 21/258* (2011.01)
*H04L 67/50* (2022.01)

(52) U.S. Cl.
CPC ..... *H04N 21/25883* (2013.01); *H04L 67/535* (2022.05)

(58) Field of Classification Search
CPC ... H04N 21/25883; H04L 67/22; H04M 1/00; H04M 3/00
See application file for complete search history.

(56) References Cited

U.S. PATENT DOCUMENTS

| 5,896,555 | A | | 4/1999 | Yoshinobu | |
| 5,917,424 | A | * | 6/1999 | Goldman | H04W 88/023 340/7.22 |
| 6,477,704 | B1 | * | 11/2002 | Cremia | H04N 7/17318 348/E7.071 |
| 8,495,745 | B1 | | 7/2013 | Schrecker et al. | |
| 2004/0015999 | A1 | * | 1/2004 | Carlucci | H04N 21/434 725/136 |
| 2004/0101128 | A1 | * | 5/2004 | Sauvage | H04M 1/50 379/361 |
| 2004/0127233 | A1 | * | 7/2004 | Harris | H04W 76/45 455/458 |

(Continued)

FOREIGN PATENT DOCUMENTS

WO 2021028060 2/2021

OTHER PUBLICATIONS

Patent Cooperation Treaty, "International Search Report," issued in connection with International Application No. PCT/US2022/015267, mailed May 12, 2022, 3 pages.

(Continued)

*Primary Examiner* — Jefferey F Harold
*Assistant Examiner* — Franklin S Andramuno

(57) ABSTRACT

Methods and apparatus to identify media application sessions are disclosed. An example apparatus includes an audio interface to monitor an audio output of a media presentation device during a viewing session, a tone analyzer to identify one or more dual-tone multi-frequency (DTMF) tones presented by the audio output of the media presentation device, a session identification determiner to determine a session identification value associated with the viewing session based on the one or more identified DTMF tones, and a session report generator to associate a panelist identifier with the viewing session, and generate a session report based on the session identification value associated with the DTMF tones and the panelist identifier associated with the viewing session.

21 Claims, 13 Drawing Sheets

(56) References Cited

U.S. PATENT DOCUMENTS

| | | | |
|---|---|---|---|
| 2008/0120358 A1* | 5/2008 | Yano | H04L 65/1069 |
| | | | 709/201 |
| 2009/0168769 A1* | 7/2009 | Lu | H04L 65/1069 |
| | | | 370/389 |
| 2016/0036864 A1* | 2/2016 | Ezell | H04M 7/0039 |
| | | | 709/227 |
| 2016/0360389 A1* | 12/2016 | Bianco | H04M 3/44 |
| 2018/0331757 A1 | 11/2018 | Breuer et al. | |
| 2020/0134295 A1* | 4/2020 | el Kaliouby | G06V 40/18 |

OTHER PUBLICATIONS

Patent Cooperation Treaty, "Written Opinion," issued in connection with International Application No. PCT/US2022/015267, mailed May 12, 2022, 6 pages.

* cited by examiner

METHODS AND APPARATUS TO IDENTIFY MEDIA APPLICATION SESSIONS

FIELD OF THE DISCLOSURE

This disclosure relates generally to television audience measurement, and, more particularly, to methods and apparatus to identify media application sessions.

BACKGROUND

In recent years, media devices have been provided with Internet connectivity and the ability to retrieve media from the Internet. As such, media exposure has shifted away from conventional methods of presentation, such as broadcast television, towards presentation via consumer devices accessing media via the Internet.

Media providers and/or other entities such as, for example, advertising companies, broadcast networks, etc. are often interested in the viewing, listening, and/or media behavior of audience members and/or the public in general. The media usage and/or exposure habits of monitored audience members, as well as demographic data about the audience members, are collected and used to statistically determine the size and demographics of an audience of interest.

Traditionally, audience measurement entities determine audience engagement levels for media programming and/or advertisements based on registered panel members. That is, an audience measurement entity enrolls people who consent to being monitored into a panel. The audience measurement entity then monitors those panel members to collect media measurement data identifying media (e.g., television programs, radio programs, movies, DVDs, etc.) presented to those panel members. In this manner, the audience measurement entity can determine exposure measures for different media (e.g., content and/or advertisements) based on the collected media measurement data.

Figure 1:
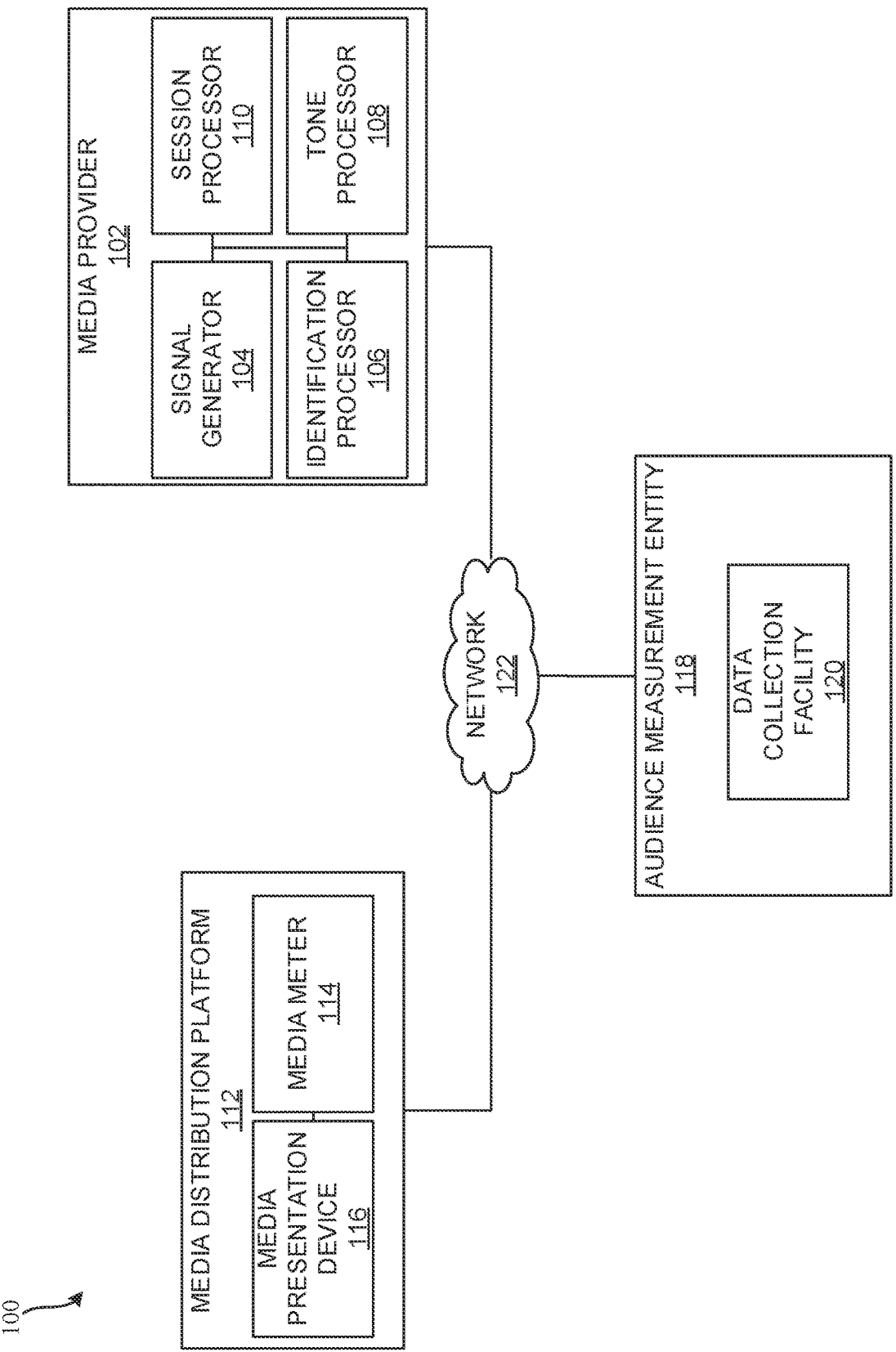
FIG. 1 is a block diagram of an example smart television session audience analysis system.

In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" refers to dimensions that may not be exact due to manufacturing tolerances and/or other real world imperfections.

DETAILED DESCRIPTION

As used herein, the term "media" includes any type of content and/or advertisement delivered via any type of distribution medium. Thus, media includes television programming or advertisements, radio programming or advertisements, movies, web sites, streaming media, etc.

Example methods, apparatus, and articles of manufacture disclosed herein monitor media presentations (e.g., smart television application sessions) at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

Audience measurement entities desire knowledge on how users interact with media devices such as smartphones, tablets, laptops, smart televisions, etc. In particular, audience measurement entities want to monitor media presentations (e.g., smart television application sessions, viewing sessions, audio-only application sessions, etc.) made at the media devices to, among other things, monitor exposure to advertisements, determine advertisement effectiveness, determine user behavior, identify purchasing behavior associated with various demographics, etc. In some instances, the audience measurement entities collect viewer data during smart television application sessions to determine characteristics (e.g., demographics) of an audience associated with the sessions. The characteristics of the audience associated with the smart television application session can be utilized to determine attributes, such as advertisements, recommendations, etc., to associate with programs encountered during the session.

Watermarking is a technique used to identify media such as television broadcasts, radio broadcasts, advertisements (television and/or radio), downloaded media, streaming media, prepackaged media, etc. Existing watermarking techniques identify media by embedding one or more codes (e.g., one or more watermarks), such as media identifying information and/or an identifier that may be mapped to media identifying information, into an audio and/or video component. In some examples, the audio or video component is selected to have a signal characteristic sufficient to hide the watermark. In known implementations, smart television application sessions include watermarks that a meter associated with a panelist identifies to determine a session identifier of the smart television application session that the panelist encountered. The panelists are users registered on panels maintained by a ratings entity (e.g., an audience measurement entity) that owns and/or operates the ratings entity subsystem.

In some instances, media providers implement the watermarks into a clip played during the smart television application session. However, to identify the smart television application session, the meter recognizes two watermarks, which are at least 1.6 seconds long. As such, in some instances, the meter can take too long to identify the smart television application session (e.g., more than 6 seconds), which can be a hinderance to viewers and/or the media provider.

Methods and apparatus to expeditiously identify smart television application sessions are disclosed. The example methods and apparatus disclosed herein identify a media session (e.g., a smart television application session, an audio-only application session, etc.) that viewers (e.g., panelists) encounters within 1 second. As a result, the example methods and apparatus disclosed herein enable viewers to quickly proceed with viewing desired content. The example methods and apparatus disclosed herein associate demographic information of the viewer with the media encountered during the media session. In turn, the example methods and apparatus disclosed herein enables media providers to receive viewer information without constraining viewers to wait an excessive amount of time (e.g., longer than 1 second) prior to viewing the desired content.

In some examples, a meter associated with the panelist identifies media device (e.g., a smart television) application sessions that the panelist encounters. In some examples, an audio interface of the meter monitors an audio output of media device during a presentation session (e.g., a smart television application session, a viewing session, etc.). In some examples, a tone analyzer of the meter identifies one or more dual-tone multi-frequency (DTMF) tones presented by the audio output of the media presentation device. In some examples, a panelist identifier of the meter associates the panelist with the media presentation device.

In some examples, a session identification determiner of the meter determines an identification value associated with the identified DTMF tones. In some examples, the session identification determiner determines the identification value based on data in a tone identification database. For example, the tone identification database can store the DTMF tones with the associated identification value of the smart television application session linked to the DTMF tones. In some examples, a session report generator generates a session report based on the identification value associated with the identified DTMF tones and the panelist identifier associated with the media presentation device.

In some examples, the tone analyzer identifies up to 10 DTMF tones within 1 second. In some examples, the DTMF tones are identified during a beginning portion (e.g., a first 1 second) of the media session. For example, the smart television application session can play a short clip (e.g., a 1 second clip) that includes the DTMF tones at the beginning of the session. As a result, the meter promptly identifies the smart television application sessions via the DTMF tones to remove and/or otherwise reduce a hinderance on viewers and/or media providers.

In some examples, the meter provides the panelist identifier and/or the identification value associated with the DTMF tones to an audience measurement entity. In such examples, the audience measurement entity determines the demographic information associated with the panelist. Further, the audience measurement entity can provide the demographic information and the identification value associated with the smart television application session that the panelist encountered to the media provider. As a result, the media provider can link demographic information of the panelist to the media that the panelist encountered during the smart television application session. In turn, the media provider can determine advertisements and/or recommendations to associate with the media presented during the smart television application session based on the demographic information of viewers that have encountered the media.

FIG. 1 is a block diagram of an example smart television session audience analysis system 100. In FIG. 1, the smart television session audience analysis system 100 includes a media provider 102, a media distribution platform 112, an audience measurement entity 118, and a network 122. In FIG. 1, the media provider 102, the media distribution platform 112, and the audience measurement entity 118 are communicatively coupled via the network 122. Although the example smart television session audience analysis system 100 utilizes the network 122 for communications between the media provider 102, the media distribution platform 112, and/or the audience measurement entity 118, it should be understood that the media provider 102, the media distribution platform 112, and/or the audience measurement entity 118, can communicate using any alternative forms of communication to implement the examples disclosed herein.

Figure 2:
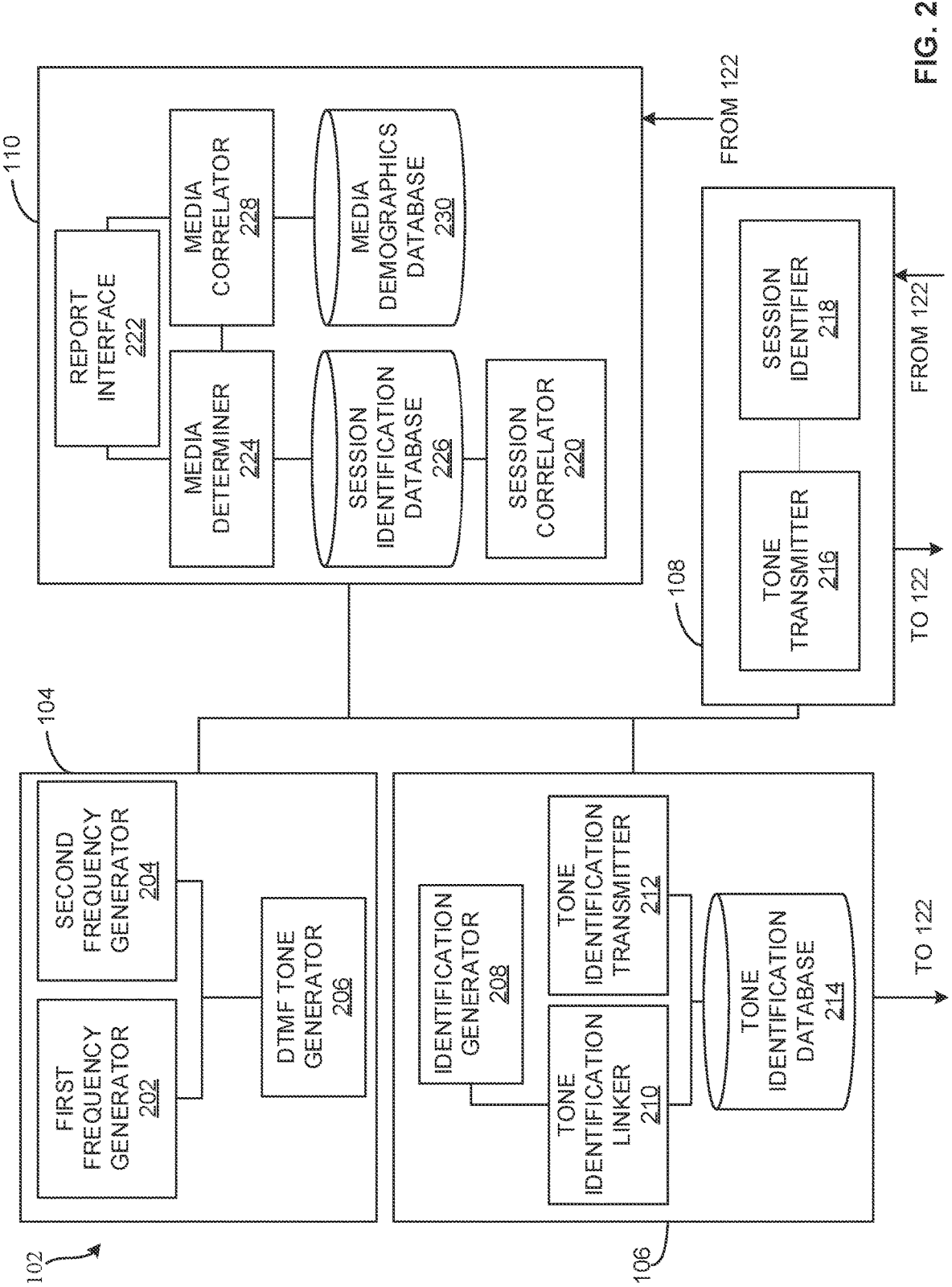
FIG. 2 is a block diagram of an example media provider of the example smart television audience analysis system of FIG. 1.

In the illustrated example of FIG. 1, the media provider 102 includes a signal generator 104, an identification processor 106, a tone processor 108, and a session processor 110, as discussed further in association with FIG. 2. In FIG. 1, the media distribution platform 112 includes a media meter 114 and a media presentation device 116, as discussed further in association with FIG. 3. In FIG. 1, the audience measurement entity 118 includes a data collection facility 120, as discussed further in association with FIG. 4.

In the illustrated example of FIG. 1, the signal generator 104 generates DTMF tones to be associated with viewing sessions. Although examples disclosed herein refer to viewing sessions, it should be understood that the examples can applied to any type of media presentation. In FIG. 1, the signal generator 104 transmits the DTMF tones to the identification processor 106 and/or the tone processor 108.

In the illustrated example of FIG. 1, the identification processor 106 generates a session identification value. In FIG. 1, the identification processor 106 assigns the session identification value to one or more of the DTMF tones. For example, the identification processor 106 can assign up to 10 DTMF tones to the session identification value. In the illustrated example, the identification processor 106 transmits the DTMF tones and the associated session identification value to the tone processor 108. In FIG. 1, the media provider 102 transmits the DTMF tones and the associated session identification value to the media distribution platform 112 via the network 122.

In the illustrated example of FIG. 1, the tone processor 108 inserts the DTMF tones into media of a viewing session (e.g., a smart television application session). In FIG. 1, the tone processor 108 receives the DTMF tones and the associated session identifiers from the identification processor 106. Further, the tone processor 108 can insert a 1 second clip including the DTMF tones into a beginning portion of the viewing session. In the illustrated example, the media provider 102 transmits the DTMF tones to the media distribution platform 112 in response to receiving a first signal indicative of a start of the viewing session. In the illustrated example, the media provider 102 receives a second signal indicative of an end time of the viewing session. In the illustrated example, the media provider 102 receives an Internet Protocol (IP) address of a device associated with the viewing session with the first signal and/or the second signal. In some examples, the tone processor 108 associates a start time, an end time, and/or a duration of the viewing session with the session identification value associated with the DTMF tones. For example, the tone inserter 108 can identify the start time, the end time, and/or the duration of the viewing session in response to receiving the first signal and the second signal. In the illustrated example, the tone processor 108 transmits the session identification value and the start time, the end time, the duration of the viewing session, and/or the IP address of the device associated with the viewing session to the session processor 110.

In FIG. 1, the session processor 110 stores the session identification values and characteristics of the associated viewing sessions. For example, the session processor 110 can store the session identification values with the IP address of the media device associated with the viewing session, the start time of the viewing session, the end time of the viewing session, and/or the duration of the viewing session. In the illustrated example, the session processor 110 determines media encountered during the viewing session based on the IP address associated with the viewing session and the start time, end time, and/or duration of the viewing session. Further, the session processor 110 can associate media encountered during the viewing sessions with the corresponding session identification values.

In the illustrated example of FIG. 1, the media provider 102 receives session demographics reports from the audience measurement entity 118 via the network 122. For example, the audience measurement entity 118 can indicate the session identification value, demographics of the viewer (e.g., the panelist), media devices associated with the viewer, and/or a timestamp associated with the viewing session to the media provider 102. Further, the session processor 110 can determine the viewing session and, thus, the media that the viewer encountered based on the session identification value, the media devices associated with the viewer, and/or the timestamp associated with the viewing session. In the illustrated example, the session processor 110 associates the media encountered by the viewer with the demographics of the viewer. In turn, the media provider 102 can determine advertisements and/or recommendations to associate with the media based on the demographics of the viewers that typically encounter the media.

In the illustrated example of FIG. 1, the media presentation device 116 presents (e.g., displays, outputs, etc.) the media to the panelist associated with the media meter 114. In FIG. 1, the media presentation device 116 transmits a signal to the media provider 102 via the network 122 in response to the start and/or the end of the viewing session. In some examples, the signal includes the IP address of the media presentation device 116. In FIG. 1, the media presentation device 116 receives the DTMF tones associated with the viewing session via the network 122. In FIG. 1, the media presentation device 116 presents the DTMF tones prior to and/or with the media of the viewing session. For example, the media presentation device 116 can present the DTMF tones during a beginning portion (e.g., a first second) of the viewing session.

In the illustrated example of FIG. 1, the media meter 114 identifies the DTMF tones presented by the media presentation device 116. In the illustrated example, the media meter 114 determines the session identification value associated with the viewing session based on the identified DTMF tones. In the illustrated example, the media meter 114 generates a timestamp in response to determining the session identification value and/or identifying the DTMF tones. In the illustrated example, the media meter 114 determines a panelist identifier of the viewer associated with the media meter 114. In FIG. 1, the media meter 114 generates a session report including the panelist identifier, the timestamp, and/or the session identification value associated with the viewing session. In FIG. 1, the media meter 114 transmits the session report to the audience measurement entity 118 via the network 122.

In the illustrated example of FIG. 1, the data collection facility 120 receives the session report from the media meter 114 via the network 122. In some examples, the data collection facility identifies demographics (e.g., an age, a gender, an ethnicity, etc.) of the panelist associated with the viewing session and/or media devices associated with the panelist based on the panelist identifier in the session report. In some examples, the data collection facility 120 generates a session demographics report based on the session identification value, the timestamp associated with the viewing session, the demographics associated with the panelist identifier, and/or the media devices associated with the panelist identifier. In some examples, the audience measurement entity 118 transmits the session demographics report to the media provider 102 via the network 122.

In the illustrated example of FIG. 1, the network 122 provides communication between the media provider 102, the media distribution platform 112, and the audience measurement entity 118. In FIG. 1, the network 122 is implemented as a public network such as, for example, the Internet. However, any other type of networks (e.g., wired/cabled, wireless, mobile cellular, etc.) which may be public or private, and any combination thereof may additionally and/or alternatively be used.

FIG. 2 is a block diagram of the media provider 102 of the example smart television session audience analysis system 100 of FIG. 1. In FIG. 2, the media provider 102 includes the signal generator 104, the tone identification processor 106, the tone processor 108, and the session processor 110 of FIG. 1. In FIG. 2, the signal generator 104 includes a first frequency generator 202, a second frequency generator 204, and a DTMF tone generator 206. In FIG. 2, the tone identification processor 106 includes an identification generator 208, a tone identification linker 210, a tone identification transmitter 212, and a tone identification database 214. In FIG. 2, the tone processor 108 further includes a tone transmitter 216 and a session identifier 218. In FIG. 2, the session processor 110 further includes a session correlator 220, a report interface 222, a media determiner 224, a session identification database 226, a media correlator 228, and a media demographics database 230.

In FIG. 2, the signal generator 104, the tone identification processor 106, the session processor 108, and/or the tone inserter 110 are communicatively coupled. In FIG. 2, the tone identification processor 106, the session processor 108, and/or the tone inserter 110 are communicatively coupled to the network 122 of FIG. 1.

In FIG. 2, the first frequency generator 202 generates audio tones at first frequencies (e.g., 1209 Hertz (Hz), 1336 Hz, 1477 Hz, 1633 Hz). In the illustrated example, the first frequency generator 202 transmits the audio tones at the first frequencies to the DTMF tone generator 206.

In FIG. 2, the second frequency generator 204 generates audio tones at second frequencies (e.g., 697 Hz, 770 Hz, 852 Hz, 941 Hz). In FIG. 2, the second frequencies are different from the first frequencies. In some examples, the audio tones generated by the second frequency generator 204 include lower frequencies than audio tones generated by the first frequency generator 202. In FIG. 2, the second frequency generator 204 transmits the audio tones at the second frequencies to the DTMF tone generator 206.

In FIG. 2, the DTMF tone generator 206 receives the audio tones at the first and second frequencies from the first frequency generator 202 and the second frequency generator 204, respectively. In FIG. 2, the DTMF tone generator 206 generates DTMF tones using the first and second frequency audio tones. For example, the DTMF tone generator 206 can combine ones of the first frequency audio tones and the second frequency audio tones to produce the DTMF tones. In FIG. 2, the signal generator 104 transmits the DTMF tones to the tone identification processor 106 and/or the tone inserter 110.

In FIG. 2, the identification generator 208 generates an identification value (e.g., a session identification value, a string of alphanumeric characters) for a viewing session. For example, the identification generator 208 can generate a string of alphanumeric characters to be associated with the viewing session and at least one of the DTMF tones. In some examples, the identification generator 208 generates 1.0995E12 ($16^{10}$) distinct session identifiers corresponding to the 1.0995E12 possible DTMF tone combinations utilized to identify the viewing sessions in 1 second or less. In FIG. 2, the identification generator 208 transmits identification values to the tone identification linker 210.

In FIG. 2, the tone identification linker 210 receives the DTMF tones from the signal generator 104. In FIG. 2, the tone identification linker 210 receives the identification values from the identification generator 208. In FIG. 2, the tone identification linker 210 links at least one of the DTMF tones to an identification value. For example, the tone identification linker 210 can associate up to 10 DTMF tones with an identification value. In FIG. 2, the tone identification linker 210 transmits the identification values and associated DTMF tone(s) to the tone identification database 212. In FIG. 2, the tone identification processor 106 transmits the DTMF tone(s) and the associated identification value to the tone processor 108.

In FIG. 2, the tone identification transmitter 212 transmits the identification values and the associated DTMF tone(s) to the network 122. For example, the tone identification database 214 can store the identification value and the associated DTMF tone(s) in response to receiving the identification values and the associated DTMF tone(s) from the tone identification linker 210. As such, the tone identification transmitter 211 can transmit the tone identification database 212 to the network 122 to provide the media distribution platform 112 access to the identification values associated with respective DTMF tones.

In FIG. 2, the tone transmitter 216 inserts the DTMF tone(s) into a viewing session. For example, the tone processor 108 can receive a signal indicative of a start of the viewing session via the network 122. In turn, the tone transmitter 216 can transmit the DTMF tone(s) to the network 122 in response to the start of the viewing session. In some examples, the media provider 102 transmits the DTMF tones to the network 122 with media to be presented during the viewing session.

In FIG. 2, the session identifier 218 receives the identification values and the associated DTMF tone(s) from the tone identification processor 106. In some examples, the session identifier 218 indicates the DTMF tone(s) to be transmitted to the tone transmitter 216. For example, the session identifier 218 can track a queue of the identification values and associated DTMF tone(s) to be utilized based on the identification values that are not assigned to viewing sessions. In FIG. 2, the tone processor 108 receives a signal indicative of an identification value being received in a report (e.g., a session demographics report) via the network 122. In FIG. 2, the session identifier 218 updates the queue in response to receiving the signal indicative of the identification value being received in the report. Specifically, the session identifier 218 reinserts the identification value and associated DTMF tone(s) into the queue. In turn, the session identifier 218 removes the identification value and associated DTMF tone(s) from the queue in response to tone transmitter 216 transmitting the DTMF tone(s). As a result, the tone transmitter 216 transmits distinct DTMF tone(s) for viewing sessions without depleting a supply of the DTMF tone(s).

In FIG. 2, the session identifier 218 determines the viewing session associated with the transmitted DTMF tones. For example, the tone processor 108 can receive a signal indicative of an end of the viewing session via the network 122. In turn, the session identifier 218 can determine a start time, an end time, and/or a duration of the viewing session. In FIG. 2, the tone processor 108 receives an IP address of the media device associated with the viewing session. In some examples, the session identifier 218 identifies the identification value associated with the transmitted DTMF tone. In FIG. 2, the session identifier 218 associates the identification value with the IP address of the media device, the start time, the end time, and/or the duration of the viewing session. In FIG. 2, the tone processor 108 transmits the identification value and the associated IP address, start time, end time, and/or duration of the viewing session to the session processor 110.

In FIG. 2, the session correlator 220 receives the identification value and the associated IP address, start time, end time, and/or duration of the viewing session. In FIG. 2, the session processor 110 receives data regarding media encountered by media devices (e.g., the media presentation device 116) via the network 122. In FIG. 2, the session correlator 220 identifies media presented during the viewing session based on the IP address, the start time, the end time, and/or the duration of the viewing session. In FIG. 2, the session correlator 220 transmits the identification value associated with the viewing session to the session identification database 226 with the media encountered during the viewing session. In some other examples, the session correlator 220 transmits the identification value of the viewing session with the associated IP address, start time, end time, and/or duration of the viewing session to the session identification database 226.

In FIG. 2, the session processor 110 receives the identification value of the viewing session, demographics of the panelist associated with the viewing session, media devices associated with the panelist, and/or a timestamp associated with the viewing session (e.g., a session demographics report) via the network 122. In the illustrated example, the audience measurement entity 118 generates the session demographics report for the viewing session, as discussed further in association with FIG. 4. In FIG. 2, the report interface 222 receives the session demographics report. In FIG. 2, the session processor 110 transmits a signal indicative of the received identification value to the tone processor 108.

In FIG. 2, the report interface 214 identifies demographics of the panelist associated the viewing session, the session identification value, the time of the viewing session, and/or the media devices associated with the panelist via the session demographics report. In FIG. 2, the report interface 214 transmits the session identification value, the time of the viewing session, and/or the media devices associated with the panelist to the media determiner 224. Further, the report interface 214 transmits the demographics of the panelist associated with the viewing session to the media correlator 228.

In FIG. 2, the media determiner 224 determines the media that was encountered during the viewing session. For example, the media determiner 224 can identify the viewing session in the session identification database 226 based on the media devices associated with the panelist, the session identification value, and/or the time of the viewing session. Specifically, the media determiner 224 can identify the session identification value in the session identification database 226 to determine the viewing session associated with the panelist. In some examples, the media determiner 224 compares the media devices associated with the panelist to the IP address associated with the viewing session in the session identification database to verify that the viewing session is associated with the panelist. In some examples, the media determiner compares the time of the viewing session to the start time, end time, and/or duration of the viewing session in the session identification database 226 to verify that the viewing session is associated with the panelist.

In FIG. 2, the media determiner 224 determines the media encountered during the viewing session based on the media associated with the IP address of the media device, the start time, the end time, and/or the duration of the viewing sessions in the session identification database 226. In FIG. 2, the media determiner 224 transmits the media encountered during the viewing session to the media correlator 228.

In FIG. 2, the media correlator 228 correlates the media encountered during the viewing session with the demographics of the panelist. For example, the media correlator 228 can receive the demographics of the panelist from the report interface 222. Further, the media correlator 228 can receive the media encountered during viewing session from the media determiner 224. In turn, the media correlator 228 saves the media encountered during the viewing session and the associated demographics of the panelist in the media demographics database 230. As such, the media demographics database 230 can be utilized to determine a relationship between media interests and certain demographics. Further, the media provider 102 can utilize the media interests of certain demographics to determine advertisements, media recommendations, etc. to associate with the media that targets the demographics of the viewers.

Figure 3:
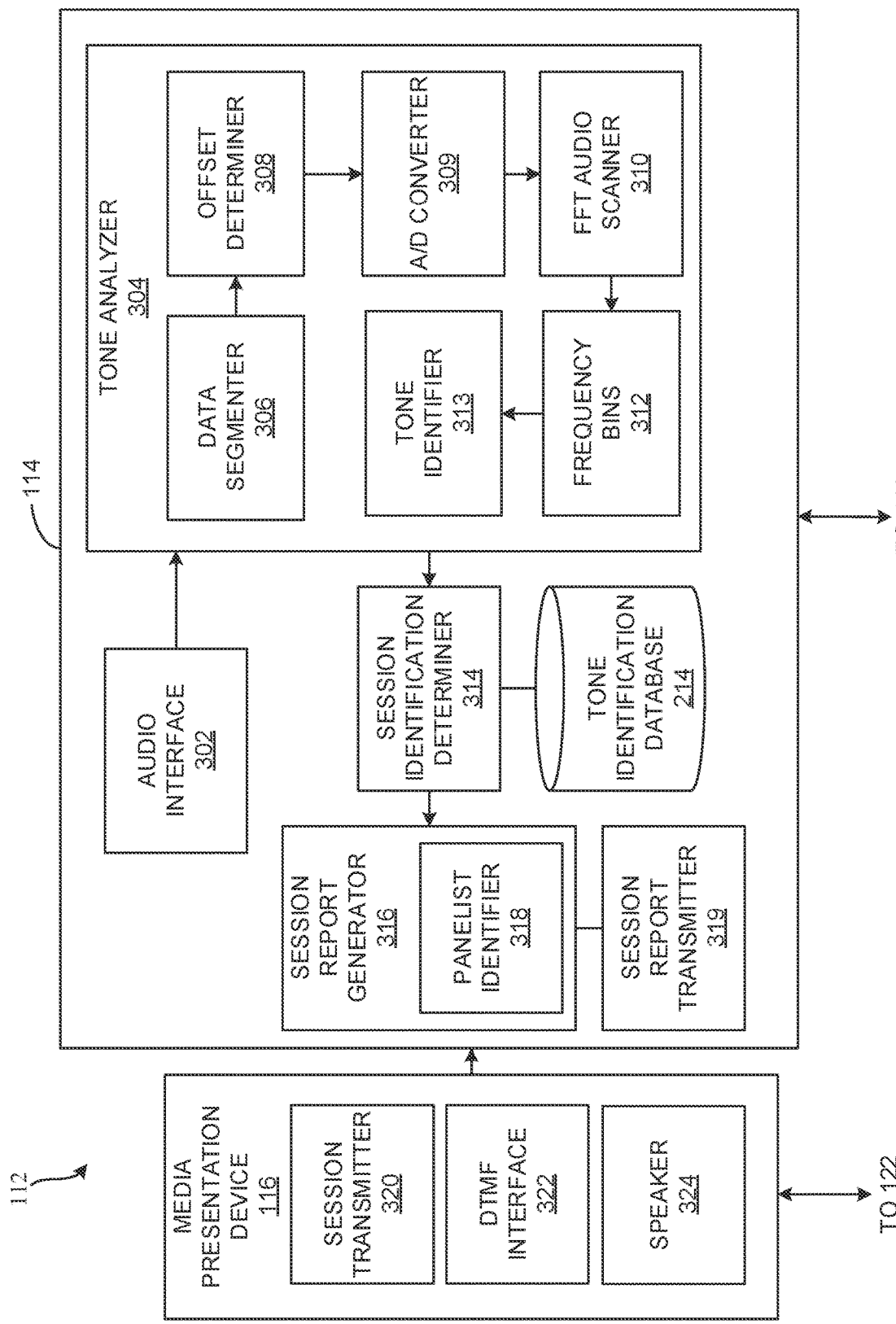
FIG. 3 is a block diagram of an example media distribution platform of the example smart television audience analysis system of FIG. 1.

FIG. 3 is a block diagram of the example media distribution platform 112 of FIG. 1. In FIG. 3, the media distribution platform includes the media meter 114 and the media presentation device 116 of FIG. 1. In FIG. 3, the media meter 114 includes an audio interface 302, a tone analyzer 304, a session identification determiner 314, a session report generator 316, and the tone identification database 212 of FIG. 2. In FIG. 3, the media meter 114 receives the tone identification database 214 via the network 122. In FIG. 3, the tone analyzer 304 further includes a data segmenter 306, an offset determiner 308, an analog-to-digital (A/D) converter 309, a Fast Fourier Transform (FFT) audio scanner 310, frequency bins 312, and a tone identifier 313. In FIG. 3, the session report generator 316 further includes a panelist identifier 318. In FIG. 3, the media presentation device 116 includes a session transmitter 320, a DTMF interface 322, and a media presenter (e.g., a speaker, a display, etc.) 324.

In FIG. 3, the media presentation device 116 presents media to a viewer (e.g., a panelist) during a viewing session. In some examples, the media provider 102 transmits the media to the media presentation device 116 via the network 122.

In FIG. 3, the session transmitter 320 transmits a signal indicative of a start of the viewing session to the media provider 102 via the network 122. In the illustrated example, the session transmitter 320 transmits the signal indicative of the start of the viewing session in response to receiving media to present to the viewer. In the illustrated example, the session transmitter 320 transmits a signal indicative of the end of the viewing session to the media provider 102 via the network 122. In the illustrated example, the session transmitter 320 transmits an IP address of the media device to the media provider 102 via the network 122.

In FIG. 3, the DTMF interface 322 receives a signal indicative of the DTMF tone(s) associated with the viewing session via the network 122. In FIG. 3, the DTMF interface 322 indicates the DTMF tone(s) to the media presenter 324 in response to receiving the signal indicative of the DTMF tone(s).

In FIG. 3, the media presenter 324 audibly presents the DTMF tone(s). For example, the media presenter 324 can audibly present the DTMF tone(s) in a 1-second clip at the start of the viewing session (e.g., prior to presentation of the media). In turn, the media presenter 324 can present media of the viewing session in response to presenting the DTMF tone(s).

In FIG. 3, the audio interface 302 of the media meter 114 monitors an audio output of the media presentation device 116. For example, the audio interface 302 can measure the amplitude of the audio output from the media presentation device 116 overtime. In FIG. 3, the audio interface 302 transmits an analog signal indicative of the audio output to the tone analyzer 304.

In FIG. 3, the tone analyzer 304 receives the signal indicative of the audio output from the audio interface 302. In FIG. 3, the data segmenter 306 divides the audio signal into segments (e.g., time segments) for analysis. Further, the data segmenter 306 can transmit the segments of the audio signal to the offset determiner 308.

In FIG. 3, the offset determiner 308 determines a direct current (DC) offset of the audio signal. In FIG. 3, the offset determiner 308 adjusts the audio signal based on the determined DC offset. In the illustrated example, the offset determiner 308 transmits the audio signal to the A/D converter 309.

In FIG. 3, the A/D converter 309 converts the analog audio output signal from the audio interface 302 to a digital audio signal. In FIG. 3, the A/D converter 305 transmits the digital audio signal to the Fast Fourier Transform (FFT) audio scanner 310. In FIG. 3, the FFT audio scanner 310 converts the digital audio signal into frequency components. Further, the FFT audio scanner 310 transmits the frequency components of the audio signal to the frequency bins 312. In FIG. 3, the frequency bins 312 store the audio signal based on the frequency components thereof.

In FIG. 3, the tone identifier 313 identifies the DTMF tone(s) presented by the media presentation device 116 based on the frequency components of the audio signal. For example, the tone identifier 313 can analyze the frequency bins 312 to determine the DTMF signal(s) transmitted by the media presentation device 116. In FIG. 3, the tone analyzer 313 transmits a signal indicative of the identified DTMF tone(s) to the session identification determiner 314.

In FIG. 3, the session identification determiner 314 determines the identification value associated with the identified DTMF tone(s). For example, the session identification determiner 314 can identify the associated DTMF tone(s) in the tone identification database 212. Further, the session identification determiner 314 can correlate the identification value with the identified DTMF tone(s) in the tone identification database 212. In FIG. 3, the session identification determiner 314 generates a timestamp in response to receiving the signal indicative of the identified DTMF tones. As such, the timestamp indicates an approximate start time (e.g., plus or minus 1 second) of the viewing session. In FIG. 3, the session identification determiner 314 transmits the session identification value and/or the approximate start time of the viewing session to the session report generator 316.

In FIG. 3, the session report generator 316 includes the panelist identifier 318 associated with the media meter 114. In FIG. 3, the panelist identifier 318 is indicative of the panelist associated with the media meter 114. Further, the session report generator 316 generates a session report based on the determined session identification value, the panelist identifier 318, and/or the approximate start time of the viewing session. In some examples, the session report generator 316 includes a fingerprint of media devices associated with the panelist in the session report. In FIG. 3, the media meter 114 transmits the session report to the audience measurement entity 118 of FIG. 1 via the network 122.

Figure 4:
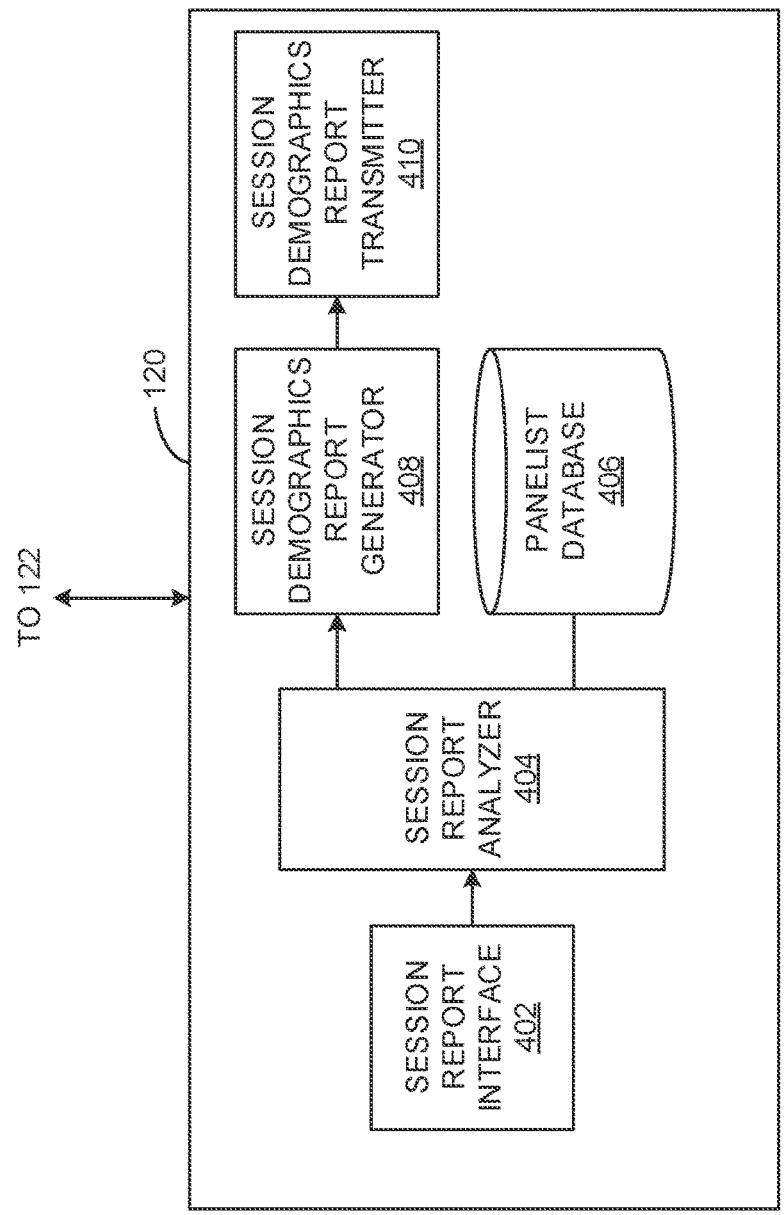
FIG. 4 is a block diagram of an example audience measurement entity of the example smart television audience analysis system of FIG. 1.

FIG. 4 is a block diagram of the audience measurement entity 118 of FIG. 1. In FIG. 4, the audience measurement entity 118 includes the data collection facility 120 of FIG. 1. In FIG. 4, the data collection facility 120 includes a session report interface 402, a session report analyzer 404, a panelist database 406, a session demographics report generator 406, and a session demographics report transmitter 410.

In FIG. 4, the session report interface 402 receives a session report associated with a viewing session via the network 122. For example, the session report interface 402 can receive the session report from the media meter 114 via the network 122. In the illustrated example, the session report interface 402 transmits the session report to the session report analyzer 404.

In FIG. 4, the session report analyzer 404 analyzes the session report to determine demographics associated with the viewing session. For example, the session report analyzer 404 can identify the panelist identifier 318 of the panelist associated with the viewing session based on the session report. In FIG. 4, the panelist database 406 stores demographic information of panelists with associated panelist identifiers (e.g., the panelist identifier 318). In FIG. 4, the session report analyzer 404 identifies the panelist identifier 318 in the panelist database 406 to determine associated the demographic information of the panelist. In FIG. 4, the session report analyzer 404 transmits the demographic information of the panelist, the session identification value, the fingerprint of media devices associated with the panelist, and/or the approximate start time of the viewing session to the session demographics report generator 408.

In FIG. 4, the session demographics report generator 408 generates the session demographics report based on the session identification value associated with the viewing session, the demographic information associated with the panelist that encountered the viewing session, the fingerprint of media devices associated with the panelist, and/or the approximate start time of the viewing session. In the illustrated example, the session demographics report generator 408 relays the session demographics report to the session demographics report transmitter 410.

In FIG. 4, the data collection facility 120 transmits the session demographics report to the network 122. In the illustrated example, the session demographics report transmitter 410 transmits the session demographics report to the media provider 102 via the network.

Figure 5:
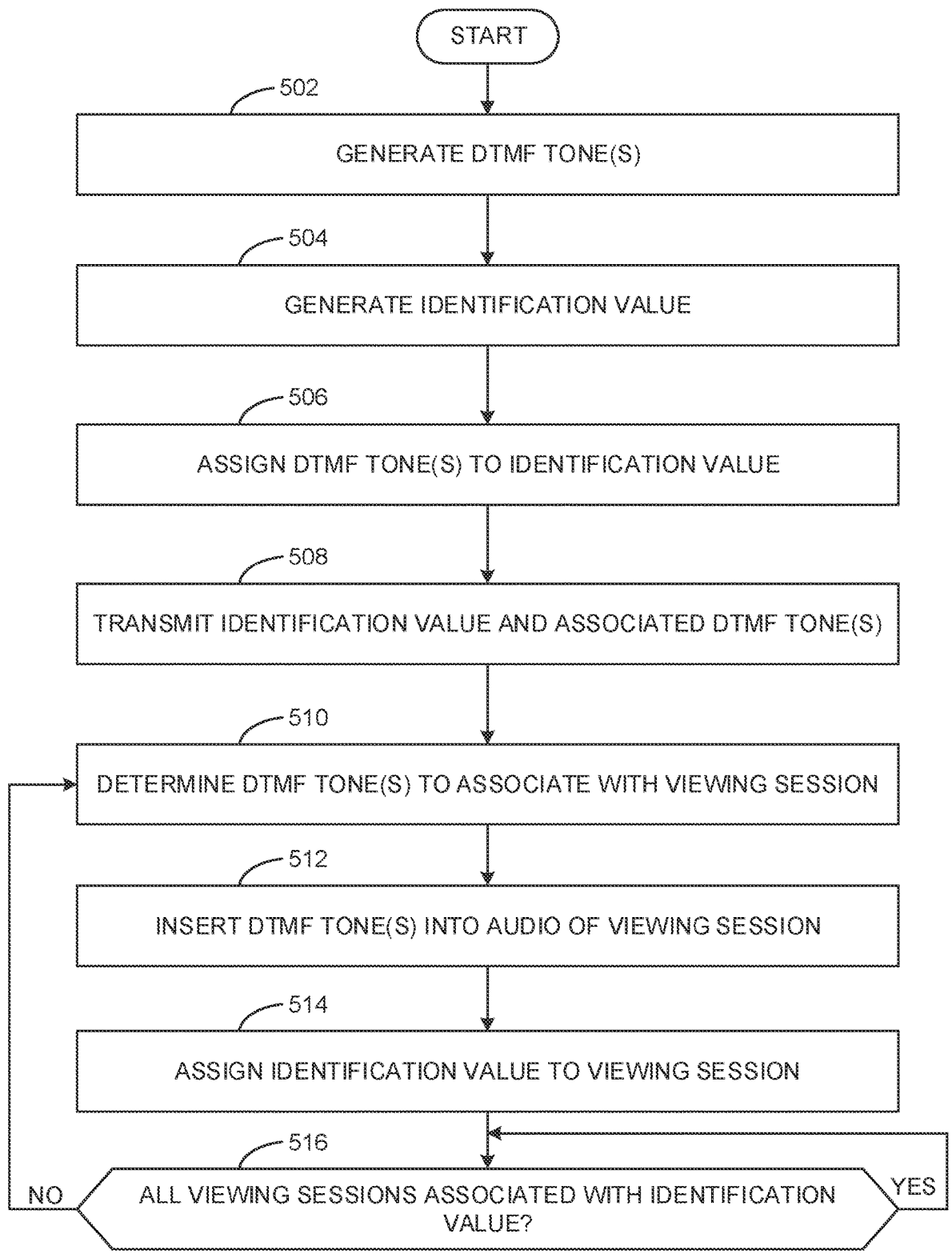
FIG. 5 is a first flowchart representative of example computer readable instructions that may be executed to implement the example media provider of FIG. 2 of the example smart television audience analysis system of FIG. 1.

While an example manner of implementing the media provider 102 of FIGS. 1 and 2 is illustrated in FIGS. 5 and/or 9, one or more of the elements, processes and/or devices illustrated in FIGS. 5 and/or 9 may be combined, divided, re-arranged, omitted, eliminated and/or implemented in any other way. Further, the example signal generator 104, the example tone identification processor 106, the example tone processor 108, the example session processor 110, the example first frequency generator 202, the example second frequency generator 204, the example DTMF tone generator 206, the example identification generator 208, the example tone identification linker 210, the example tone identification transmitter 212, the example tone identification database 214, the example tone transmitter 216, the example session identifier 218, the example session correlator 220, the example report interface 222, the example media determiner 224, the example session identification database 226, the example media correlator 228, the example media demographics database 230 and/or, more generally, the example media provider 102 of FIGS. 1 and 2 may be implemented by hardware, software, firmware and/or any combination of hardware, software and/or firmware. Thus, for example, any of the example signal generator 104, the example tone identification processor 106, the example tone processor 108, the example session processor 110, the example first frequency generator 202, the example second frequency generator 204, the example DTMF tone generator 206, the example identification generator 208, the example tone identification linker 210, the example tone identification transmitter 212, the example tone identification database 214, the example tone transmitter 216, the example session identifier 218, the example session correlator 220, the example report interface 222, the example media determiner 224, the example session identification database 226, the example media correlator 228, the example media demographics database 230 and/or, more generally, the example media provider 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, example signal generator 104, the example tone identification processor 106, the example tone processor 108, the example session processor 110, the example first frequency generator 202, the example second frequency generator 204, the example DTMF tone generator 206, the example identification generator 208, the example tone identification linker 210, the example tone identification transmitter 212, the example tone identification database 214, the example tone transmitter 216, the example session identifier 218, the example session correlator 220, the example report interface 222, the example media determiner 224, the example session identification database 226, the example media correlator 228, the example media demographics database 230 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media provider 102 of FIGS. 1 and 2 may include one or more elements, processes and/or devices in addition to, or instead of, those illustrated in FIGS. 5 and/or 9, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the media provider 102 of FIGS. 1 and 2 is shown in FIGS. 5 and/or 9. The machine readable instructions may be one or more executable programs or portion(s) of an executable program for execution by a computer processor and/or processor circuitry, such as the processor 912 shown in the example processor platform 1000 discussed below in connection with FIG. 10 (e.g., instructions may be executed to cause the computer processor and/or processor circuitry to perform operations identified in the flowcharts). The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIGS. 5 and/or 9, many other methods of implementing the example media provider 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5 and/or 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a first flowchart of example machine readable instructions 500 that may be executed to implement the media provider 102 of FIGS. 1 and 2. At block 502, the media provider 102 generates DTMF tone(s). For example, the signal generator 104 can generate the DTMF tone(s) to be assigned to session identification values and, in turn, viewing sessions. In some examples, the first frequency generator 204 generates audio tones at first frequencies. In some examples, the second frequency generator 206 generates audio tones at second frequencies. In some examples, the DTMF tone generator 208 combines the audio tones at the first frequencies and the second frequencies to generate the DTMF tone(s). In some examples, the signal generator 104 transmits the DTMF tone(s) to the tone identification processor 106 and/or the tone processor 108.

At block 504, the media provider 102 generates a session identification value to be associated with a viewing session. For example, the tone identification processor 106 can generate the session identification value (e.g., a string of alphanumeric characters). In some examples, the identification generator 208 generates the session identification value to be associated with a DTMF tone(s). In some examples, the identification generator 208 generates 1.0995E12 ($16^{10}$) distinct session identification values corresponding to the 1.0995E12 distinct DTMF tone combinations utilized to identify the viewing sessions in 1 second or less.

At block 506, the media provider 102 assigns the DTMF tone(s) to the session identification value. For example, the tone identification processor 106 can assign the DTMF tone(s) to the session identification value. In some examples, the tone identification linker 210 assigns up to 10 DTMF tone(s) to the session identification value. In some examples, the tone identification linker 210 stores the session identification value and the assigned DTMF tone(s) in the tone identification database 212. As such, the tone identification linker 210 utilizes a distinct DTMF tone(s) for each session identification value.

At block 508, the media provider 102 transmits the session identification values and associated DTMF tone(s). For example, the tone identification processor 106 can transmit the session identifiers and associated DTMF tone(s) to the media distribution platform 112 via the network 122. In some examples, the tone identification transmitter 212 transmits the tone identification database 214 to the meter 114 via the network 122.

At block 510 the media provider 102 determines the DTMF tone(s) and identification value to be associated with the viewing session. For example, the tone processor 108 can determine the DTMF tone(s) to associate with the viewing session. In some examples, the session identifier 218 determines the DTMF tone(s) to associate with the viewing session. For example, the session identifier 218 can utilize a queue of DTMF tone(s) and associated identification values to distinguish the DTMF tone(s) associated with viewing sessions from the DTMF tone(s) awaiting association with a viewing session. In some examples the session identifier 218 updates the queue based on received session demographics reports, as discussed further in association with FIG. 8.

At block 512, the media provider 102 inserts the DTMF tone(s) into audio of the viewing session. For example, the tone processor 108 can insert the DTMF tone(s) into the audio of the viewing session. In some examples, the tone transmitter 216 transmits the DTMF tone(s) to the network 122 in response to receiving a signal indicative of a start of the viewing session via the network 122. In such examples, the media presentation device 116 presents the DTMF tone(s) in a 1 second clip at a start of the viewing session. In some examples, the media provider 102 receives a signal indicative of a start time, an end time, and/or a duration of the viewing session via the network 122.

At block 514, the media provider 102 assigns the session identification value to the viewing session. In some examples, the session processor 108 assigns the session identification value to the viewing session in response to transmitting the associated DTMF tone(s). In some examples, the session identifier 218 receives an IP address of the media device associated with the viewing session. For example, the session identifier 218 can correlate the session identification value associated with the DTMF tone(s) to the viewing session based on the IP address of the media device associated with the viewing session, the start time, the end time, and/or the duration of the viewing session. In some examples, the session processor 108 transmits the session identification value and the associated viewing session information to the session processor 110. In such examples, the session correlator 220 stores the session identification value and the associated viewing session information in the session identification database 226.

At block 516, the media provider 102 determines whether all viewing sessions are associated with an identification value and, thus, a DTMF tone(s). For example, the session processor 108 determines if there are any viewing sessions without a session identifier. In some examples, the media provider 102 receives a signal indicative of a start of a viewing session. In such examples, the session identifier 218 determines there is/are viewing session without a session identifier in response to receiving the signal indicative of a start of a viewing session. In some examples, when there is/are a viewing session(s) without an associated session identifier, the machine readable instructions 500 return to block 510. Otherwise, if all viewing sessions have been assigned a session identifier, the machine readable instructions 500 return to block 516.

Figure 6:
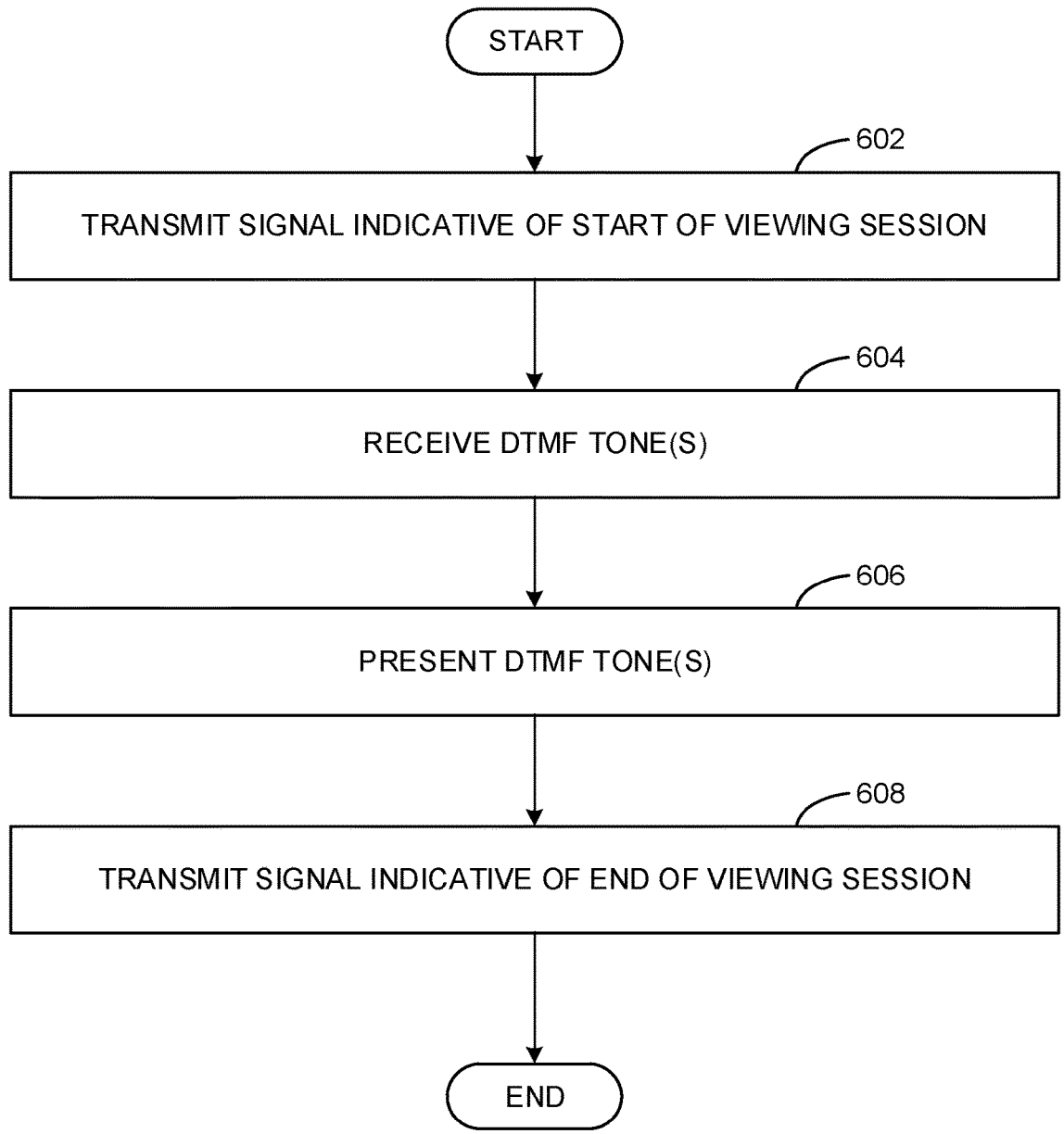
FIG. 6 is a first flowchart representative of example computer readable instructions that may be executed to implement the example media distribution platform of FIG. 3 of the example smart television audience analysis system of FIG. 1.

While an example manner of implementing the media distribution platform 112 of FIGS. 1 and 3 is illustrated in FIGS. 6 and/or 7, one or more of the elements, processes and/or devices illustrated in FIGS. and/or 7 may be combined, divided, re-arranged, omitted, eliminated and/or implemented in any other way. Further, the example media meter 114, the example media presentation device 116, the example tone identification database 214, the example audio interface 302, the example tone analyzer 304, the example data segmenter 306, the example offset determiner 308, the example, A/D converter 309, the example FFT audio scanner 310, the example frequency bins 312, the example tone identifier 313, the example session identification determiner 314, the example session report generator 316, the example panelist identifier 318, the example session report transmitter 319, the example session transmitter 320, the example DTMF interface 322, the example speaker 324, and/or, more generally, the example media distribution platform 112 of FIGS. 1 and 3 may be implemented by hardware, software, firmware and/or any combination of hardware, software and/or firmware. Thus, for example, any of the example media meter 114, the example media presentation device 116, the example tone identification database 214, the example audio interface 302, the example tone analyzer 304, the example data segmenter 306, the example offset determiner 308, the example, A/D converter 309, the example FFT audio scanner 310, the example frequency bins 312, the example tone identifier 313, the example session identification determiner 314, the example session report generator 316, the example panelist identifier 318, the example session report transmitter 319, the example session transmitter 320, the example DTMF interface 322, the example speaker 324, and/or, more generally, the example media distribution platform 112 of FIGS. 1 and 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, example media meter 114, the example media presentation device 116, the example tone identification database 214, the example audio interface 302, the example tone analyzer 304, the example data segmenter 306, the example offset determiner 308, the example, A/D converter 309, the example FFT audio scanner 310, the example frequency bins 312, the example tone identifier 313, the example session identification determiner 314, the example session report generator 316, the example panelist identifier 318, the example session report transmitter 319, the example session transmitter 320, the example DTMF interface 322, and/or the example speaker 324 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media distribution platform 112 of FIGS. 1 and 3 may include one or more elements, processes and/or devices in addition to, or instead of, those illustrated in FIGS. 6 and/or 7, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the media distribution platform 112 of FIGS. 1 and 3 is shown in FIGS. 6 and/or 7. The machine readable instructions may be one or more executable programs or portion(s) of an executable program for execution by a computer processor and/or processor circuitry, such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIGS. 6 and/or 7, many other methods of implementing the example media distribution platform 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

As mentioned above, the example processes of FIGS. 6 and/or 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information).

FIG. 6 is a first flowchart representative of example machine readable instructions 600 that may be executed to implement the example media distribution platform 112 of FIGS. 1 and 3. At block 602, the media distribution platform 112 transmits a signal indicative of a start of a viewing session to the network 122. For example, the media presentation device 116 can transmit the signal indicative of the start of the viewing session to the media provider 102 via the network 122. In some examples, the session transmitter 320 transmits the signal indicative of the start of the viewing session. In some examples, the session transmitter 320 transmits an IP address of the media presentation device 116 with the signal indicative of the start of the viewing session.

At block 604, the media distribution platform 112 receives DTMF tone(s) via the network 122. For example, the media presentation device 116 can receive DTMF tone(s) associated with the viewing session from the network 122. In some examples, the DTMF interface 322 receives the DTMF tone(s) from the media provider 102 via the network 122.

At block 606, the media distribution platform 112 presents the DTMF tone(s). For example, the media presentation device 116 can present the DTMF tone(s) during a start of the viewing session. In some examples, the speaker 324 audibly outputs the DTMF tone(s) in advance of the media presentation device 116 presenting media associated with the viewing session.

At block 608, the media distribution platform 112 transmits a signal indicative of an end of the viewing session to the network 122. For example, the media presentation device 116 can transmit the signal indicative of the end of the viewing session to the media provider 102 via the network 122. In some examples, the session transmitter 320 transmits the signal indicative of the end of the viewing session. In some examples, the session transmitter 320 transmits the IP address of the media presentation device 116 with the signal indicative of the end of the viewing session.

Figure 7:
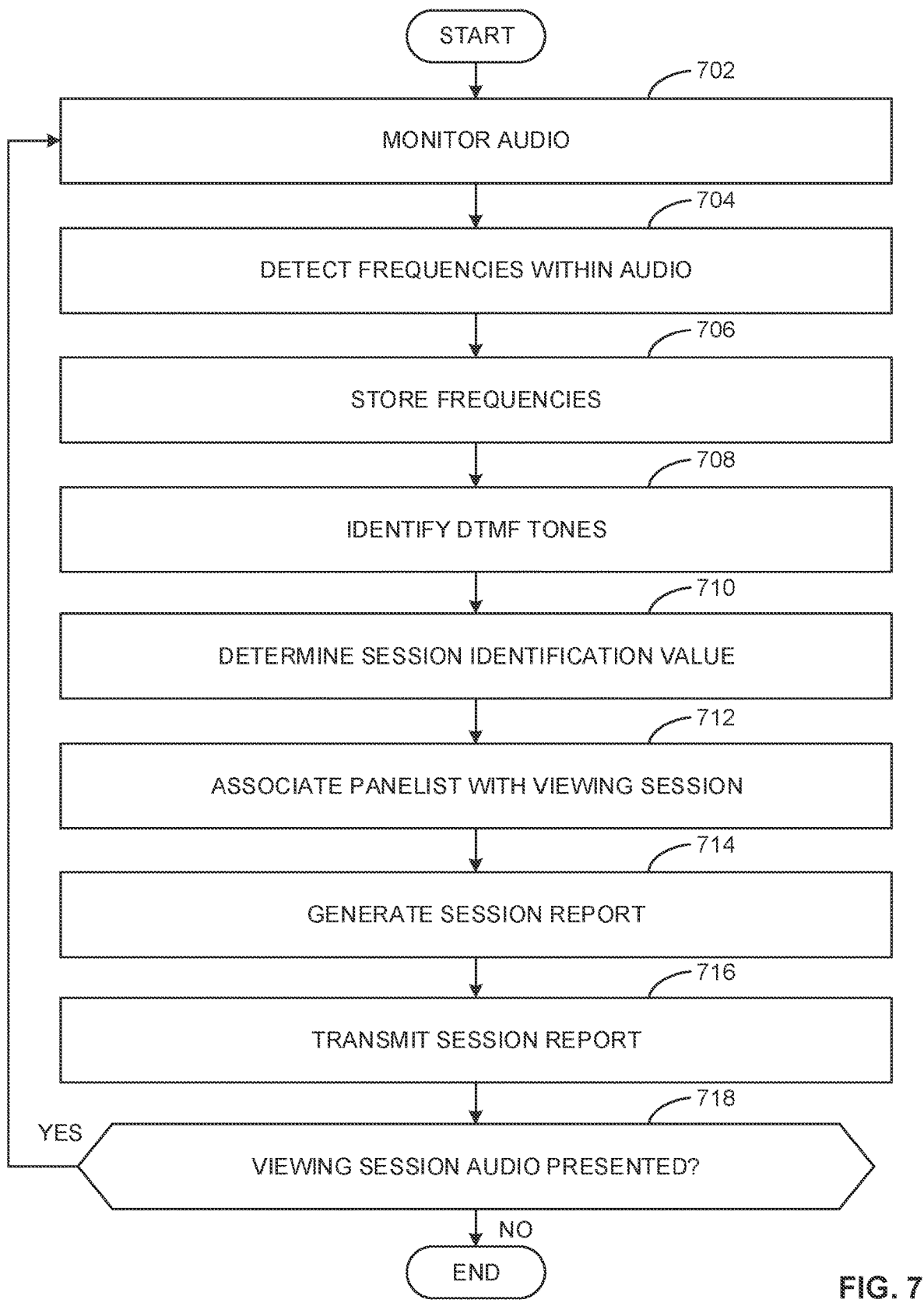
FIG. 7 is a second flowchart representative of example computer readable instructions that may be executed to implement the example media distribution platform of FIG. 3 of the example smart television audience analysis system of FIG. 1.

FIG. 7 is a second flowchart representative of example machine readable instructions 700 that may be executed to implement the example media distribution platform 112 of FIGS. 1 and 3. At block 702, the media distribution platform 112 monitors audio. For example, the media meter 114 can monitor audio presented by the media presentation device 116. In some examples, the audio interface 302 continuously monitors the audio output of the speaker 324 of the media presentation device 116. As such, the audio interface 302 can receive DTMF tone(s) presented during a beginning portion of a viewing session.

At block 704, the media distribution platform 112 detects frequencies within the audio. For example, the media meter 114 can detect frequencies within the audio presented by the media presentation device 116. In some examples, the tone analyzer 304 detects the frequencies within the audio output of the speaker 324 of the media presentation device 116. For example, the audio interface 302 can transmit a signal indicative of the monitored audio output to the tone analyzer 304. Further, the data segmenter 306 can divide the audio signal into segments of amplitude over time. In turn, the offset determiner 308 can determine the DC offset of the audio segments. In some examples, the offset determiner 308 adjusts the audio signal based on the DC offset. In some examples, the A/D converter 309 converts the audio segments into digital audio segments. In turn, the FFT audio scanner 310 converts the digital audio segments into frequency components to detect the frequencies within the audio output of the media presentation device 116.

At block 706, the media distribution platform 112 stores the frequencies of the audio. For example, the media meter 114 can store the frequencies detected within the audio output of the media presentation device 116. In some examples, the tone analyzer 304 stores the frequencies presented by the speaker 324 in frequency bins 312. For example, the FFT audio scanner 310 transmits the frequency components of the audio output to the frequency bins 312. As such, the frequency bins 312 sort and store the frequency components based on the associated frequencies.

At block 708, the media distribution platform 112 identifies DTMF tone(s) presented by the audio. For example, the media meter 114 can determine the DTMF tone(s) presented by the media presentation device 116. In some examples, the tone analyzer 304 determines the DTMF tone(s) presented by the speaker 324. In such examples, the tone identifier 313 analyzes the frequency bins 312 to identify the DTMF tone(s). For example, the tone identifier 313 analyzes the frequency bins 312 to determine the DTMF tone(s) encountered by the media meter 114. In some examples, the tone analyzer 304 transmits a signal indicative of the identified DTMF tone(s) to the session identification determiner 314. In such examples, the session identification determiner 314 generates a timestamp indicative of an approximate start time (e.g., plus or minus 1 second) of the viewing session in response to receiving the identified DTMF tone(s).

At block 710, the media distribution platform 112 determines a session identification value associated with the viewing session. For example, the media meter 114 can determine the session identification value of the viewing session based on the identified DTMF tone(s). In some examples, the session identification determiner 314 correlates the identified DTMF tone(s) with the associated session identification value. For example, the session identification determiner 314 identifies the session identification value associated with the identified DTMF tone(s) in the tone identification database 212. In some examples, the media meter 114 receives the tone identification database 212 via the network 122. In some examples, the session identification determiner 314 transmits the session identification value and the approximate start time of the viewing session to the session report generator 316.

At block 712, the media distribution platform 112 associates a panelist with the viewing session. For example, the media meter 114 can determine a panelist identifier 318 associated with the media presentation device 116. In some examples, the session report generator 316 stores the panelist identifier 318 associated with the media presentation device 116 and/or the media meter 114. In some examples, the panelist identifier 318 associates the panelist with the viewing session.

At block 714, the media distribution platform 112 generates a session report. For example, the media meter 114 can generate the session report based on the session identification value associated with the viewing session, the panelist identifier 318, and/or the approximate start time of the viewing session. In some examples, the session report generator 316 generates the session report based on the session identification value, the panelist identifier 318 associated with the media meter 114, the approximate start time of the viewing session, and/or a fingerprint of media devices (e.g., the media presentation device 116) associated with the media meter 114.

At block 716, the media distribution platform 112 transmits the session report to the network 122. For example, the media meter 114 can transmit the session report to the network 122. In some examples, the report transmitter 319 transmits the session report to the audience measurement entity 118 via the network 122.

At block 718, the media distribution platform 112 determines whether audio of a viewing session is being presented. For example, the media meter 114 can determine whether the media presentation device 116 is presenting audio. In some examples, the tone analyzer 304 determines whether the audio interface 302 is detecting audio from the speaker 324. In some examples, in response to the audio interface 302 detecting audio from the speaker 324, the machine readable instructions 700 return to block 702. In some examples, in response to the audio interface 302 not monitoring audio from the speaker 324, the machine readable instructions 700 are terminated.

Figure 8:
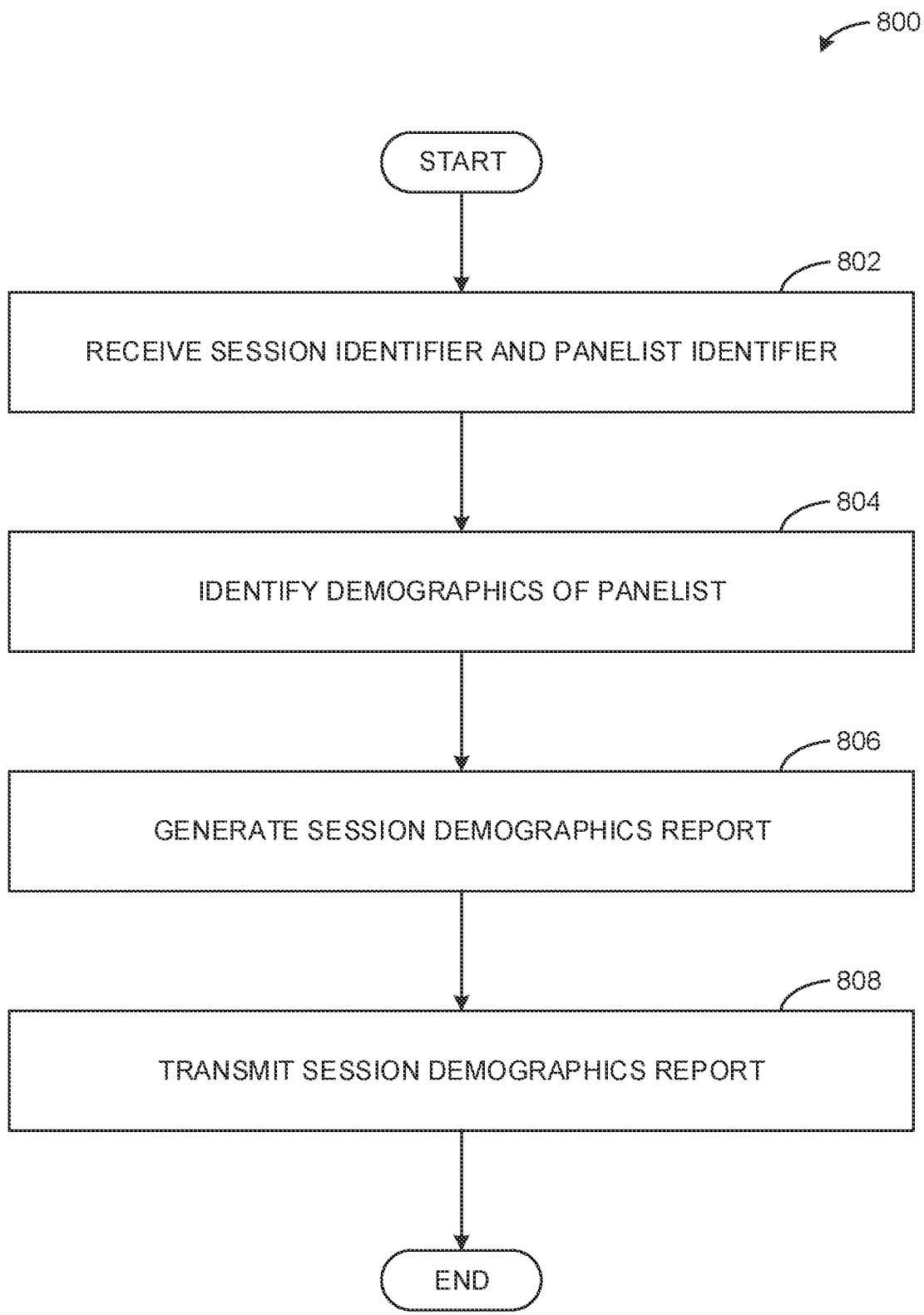
FIG. 8 is a flowchart representative of example computer readable instructions that may be executed to implement the example audience measurement entity of FIG. 4 of the example smart television audience analysis system of FIG. 1.

While an example manner of implementing audience measurement entity 118 of FIGS. 1 and 4 is illustrated in FIG. 8, one or more of the elements, processes and/or devices illustrated in FIG. 8 may be combined, divided, re-arranged, omitted, eliminated and/or implemented in any other way. Further, the example data collection facility 120, the example session report interface 402, the example session report analyzer 404, the example panelist database 406, the example session demographics report generator 408, the example session demographics report transmitter 410, and/or, more generally, the example audience measurement entity of FIGS. 1 and 4 may be implemented by hardware, software, firmware and/or any combination of hardware, software and/or firmware. Thus, for example, any of the example data collection facility 120, the example session report interface 402, the example session report analyzer 404, the example panelist database 406, the example session demographics report generator 408, the example session demographics report transmitter 410, and/or, more generally, the example audience measurement entity of FIGS. 1 and 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, example data collection facility 120, the example session report interface 402, the example session report analyzer 404, the example panelist database 406, the example session demographics report generator 408, and/or the example session demographics report transmitter 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience measurement entity 118 of FIGS. 1 and 4 may include one or more elements, processes and/or devices in addition to, or instead of, those illustrated in FIG. 8, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the audience measurement entity of FIGS. 1 and 4 is shown in FIG. 8. The machine readable instructions may be one or more executable programs or portion(s) of an executable program for execution by a computer processor and/or processor circuitry, such as the processor 1212 shown in the example processor platform 1200 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 8, many other methods of implementing the example audience measurement entity 118 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

As mentioned above, the example processes of FIG. 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information).

FIG. 8 is a flowchart representative of example machine readable instructions 800 that may be executed to implement the example audience measurement entity 118 of FIGS. 1 and 4. At block 802, the audience measurement entity 118 receives the session report. For example, the data collection facility 120 can receive the session report from the media distribution platform 112 via the network 122. In some examples, the session report interface 402 receives the session report from the media meter 114 via the network 122. In some examples, the audience measurement entity 118 receives the session report though an alternative method, such as collecting the media meter and downloading data therefrom. In some examples, the session report interface 402 transmits the session report to the session report analyzer 404.

At block 804, the audience measurement entity 118 identifies demographics associated with the panelist. For example, the data collection facility 120 can determine the demographics associated with the panelist based on the panelist identifier 318 in the session report. In some examples, the panelist database 406 stores panelist identifiers and associated demographics of the panelists. In such examples, the session report analyzer 404 determines the demographics associated with the panelist identifier 318 and, thus, the panelist based on the panelist database 406. In some examples, the session report analyzer 404 transmits the demographics associated with the panelist to the session demographics report generator 406 with the session identification value, the approximate start time of the viewing session, and/or the fingerprint of media devices associated with the media meter 114 in the session report.

At block 806, the audience measurement entity 118 generates a session demographics report. For example, the data collection facility 120 can produce the session demographics report based on the session identification value, the demographics associated with the panelist, the approximate start time of the viewing session, and/or the fingerprint of media devices associated with the media meter 114. In some examples, the session demographics report generator 408 records the session identification value, the demographics associated with the panelist, the approximate start time of the viewing session, and/or the fingerprint of media devices associated with the media meter 114 in the session demographics report. In some examples, the session demographics report generator 408 relays the session demographics report to the session demographics report transmitter 410.

At block 808, the audience measurement entity 118 transmits the session demographics report to the network 122. For example, the data collection facility 120 can transmit the session demographics report to the media provider 102 via the network 122. In some examples, the session demographics report transmitter 410 transmits the session demographics report to the network 122 in response to receiving the session demographics report from the session demographics report generator 408.

Figure 9:
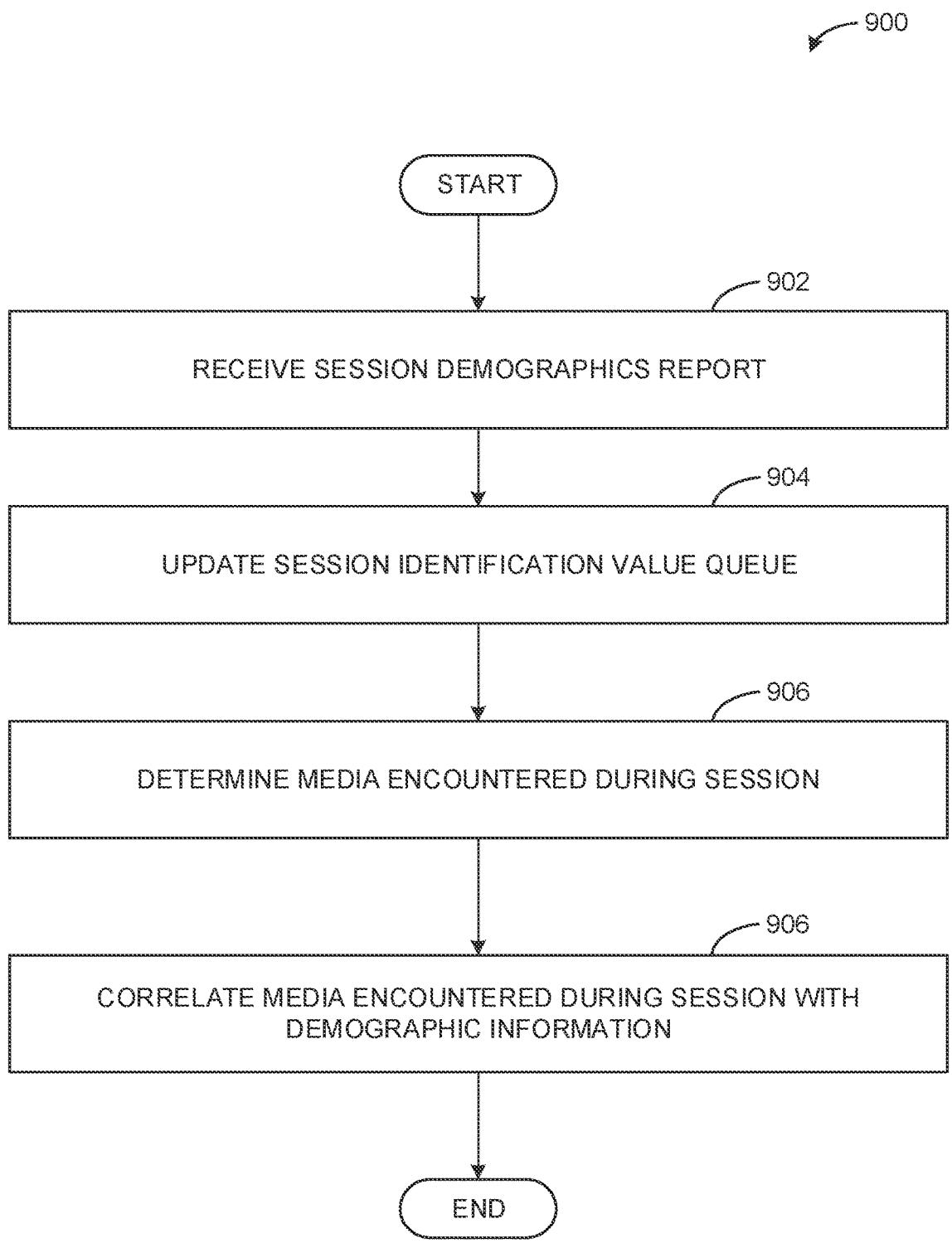
FIG. 9 is a second flowchart representative of example computer readable instructions that may be executed to implement the example media provider of FIG. 2 of the example smart television audience analysis system of FIG. 1.

FIG. 9 is a second flowchart representative of example computer readable instructions 900 that may be executed to implement the media provider 102 of FIGS. 1 and 2. At block 902, the media provider 102 receives a session demographics report via the network 122. For example, the session processor 110 can receive the session demographics report from the audience measurement entity 118 via the network 122. In some examples, the report interface 222 receives the session identification value, the demographics associated with the panelist, the approximate start time of the viewing session, and/or the fingerprint of media devices associated with the media meter 114 via the session demographics report. In such examples, the report interface 222 transmits the session identification value, the approximate start time of the viewing session, and/or the fingerprint of media devices associated with the media meter 114 to the media determiner 224. In some examples, the report interface 222 transmits the demographics of the panelist associated with the viewing session to the media correlator 228. In some examples, the session processor 110 transmits a signal indicative of the received session identification value to the tone processor 108.

At block 904, the media provider 102 updates a queue of session identification values. For example, the tone processor 108 can update the queue of session identification values in response to receiving the signal indicative of the session identification value received in the session demographics report. In some examples, the session identifier 218 updates the queue of session identification values. For example, the session identifier 218 can add the session identification value received in the session demographics report to a list of session identification values waiting to be associated with viewing sessions.

At block 906, the media provider 102 determines media encountered during the viewing session. For example, the session analyzer 110 identifies media the panelist encountered during the viewing session. In some examples, the session identification database 226 stores session identification values with media encountered during the corresponding viewing session. In such examples, the media determiner 224 identifies the session identification value in the session identification database 226 to determine the media encountered by the panelist. In some examples, the media determiner 224 compares the approximate start time of the viewing session to the start time of the viewing session in the session identification database 226 to verify the media encountered by the panelist. In some examples, the media determiner compares the fingerprint of media devices associated with the media meter 114 to the IP address of the media device associated with the viewing session in the session identification database 226 to verify the media encountered by the panelist. In some examples, the media determiner 224 transmits a signal indicative of the media encountered by the panelist to the media correlator 228.

At block 908, the media provider 102 associates the demographic information of the panelist with the media encountered by the panelist. For example, the session analyzer 110 links the demographic information associated with the panelist to the media encountered during the viewing session. In some examples, the media correlator 228 correlates demographic information to the encountered media. In such examples, the media correlator 228 stores the encountered media and the associated demographic information in the media demographics database 230.

Figure 10:
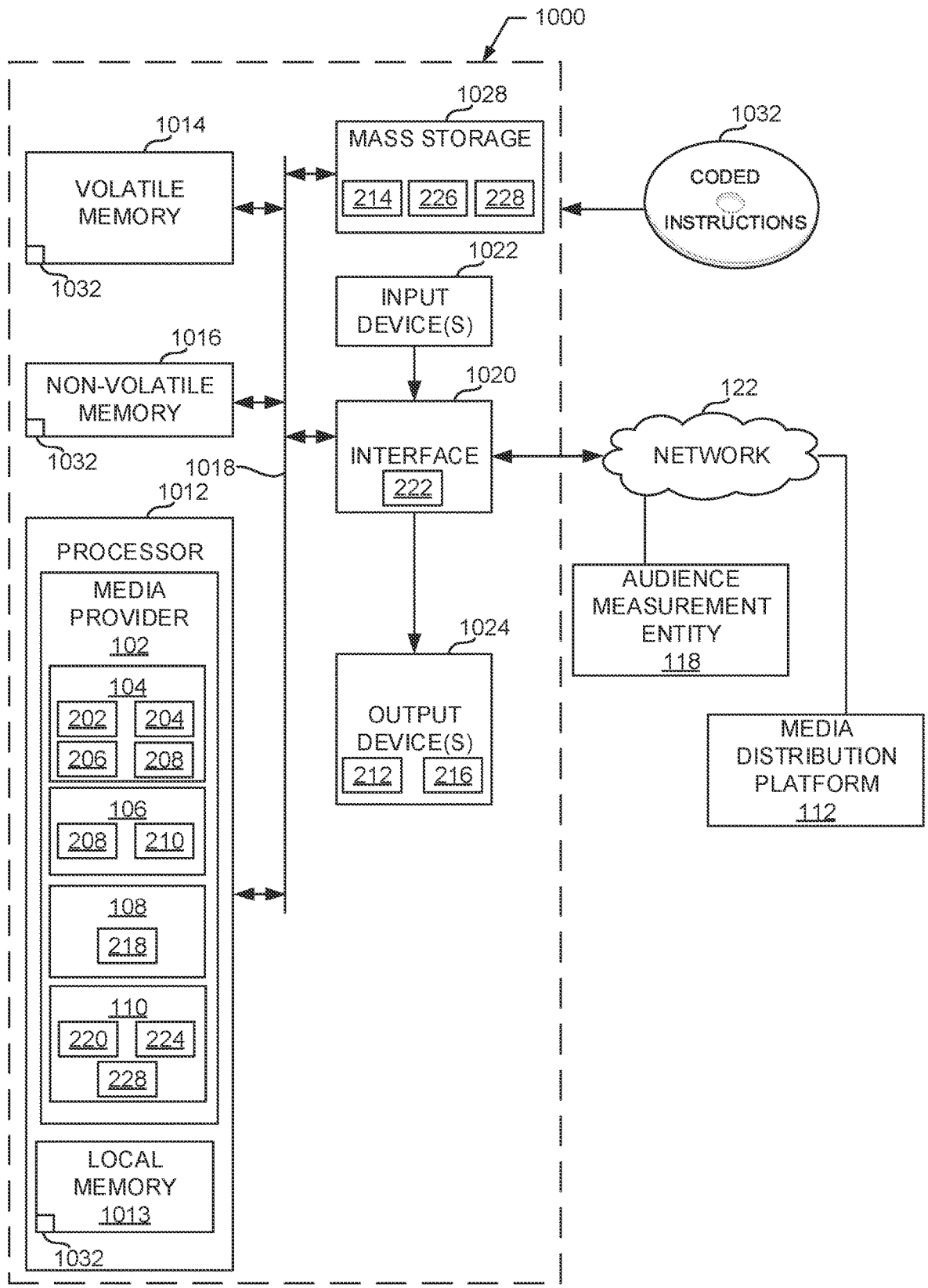
FIG. 10 is a block diagram of an example processing platform structured to execute the instructions of FIGS. 5 and/or 8 to implement the example media provider of FIGS. 1 and/or 2.

FIG. 10 is a block diagram of an example processor platform 1000 structured to execute the instructions of FIGS. 5 and 9 to implement the media provider 102 of FIGS. 1 and 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1012 implements the signal generator 104, the tone identification processor 106, the tone processor 108, the session processor 110, the first frequency generator 202, the second frequency generator 204, the DTMF tone generator 206, the identification generator 208, the tone identification linker 210, the session identifier 218, the session correlator 220, the media determiner 224, and the media correlator 228.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface. In this example, the interface circuit 920 implements the report interface 214.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip, and/or a graphics driver processor. In this example, the output device 1024 implements the tone identification transmitter 212 and the tone transmitter 216.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via the network 122. The communication can be via, for example, an Ethernet connection, a digital subscriber line (DSL) connection, a telephone line connection, a coaxial cable system, a satellite system, a line-of-site wireless system, a cellular telephone system, etc. In this example, the media distribution platform 112 and the audience measurement entity 118 are in communication with the network 122.

The processor platform 1000 of the illustrated example also includes one or more mass storage devices 1028 for storing software and/or data. Examples of such mass storage devices 1028 include the tone identification database 214, the session identification database 226, the media demo-graphics database 230, floppy disk drives, hard drive disks, compact disk drives, Blu-ray disk drives, redundant array of independent disks (RAID) systems, and digital versatile disk (DVD) drives.

The machine executable instructions 1032 of FIGS. 5 and 9 may be stored in the mass storage device 1028, in the volatile memory 1014, in the non-volatile memory 1016, and/or on a removable non-transitory computer readable storage medium such as a CD or DVD.

Figure 11:
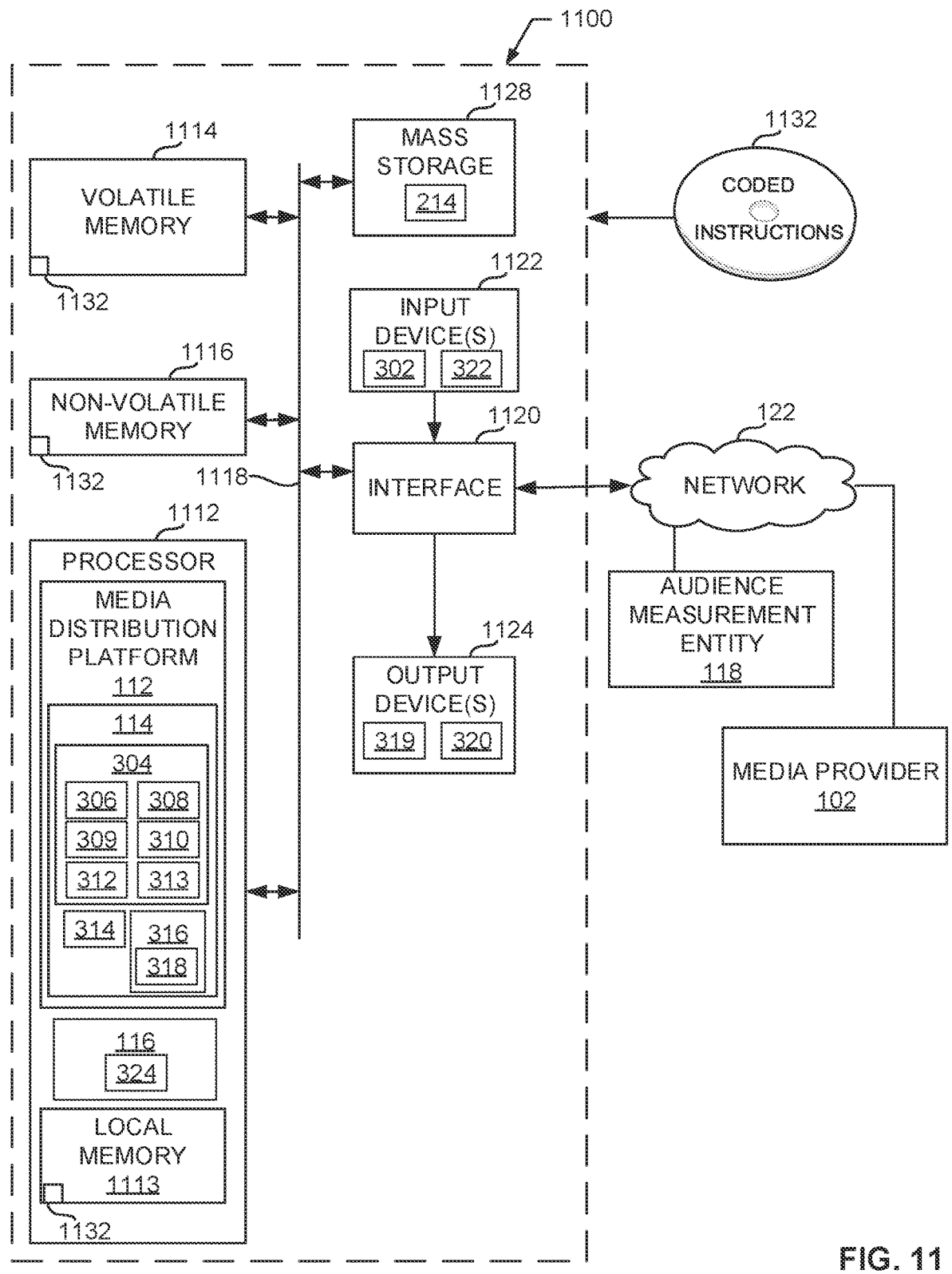
FIG. 11 is a block diagram of an example processing platform structured to execute the instructions of FIG. 6 to implement the example media distribution platform of FIGS. 1 and/or 3.

FIG. 11 is a block diagram of an example processor platform 1000 structured to execute the instructions of FIGS. 6 and/or 7 to implement the media distribution platform 112 of FIGS. 1 and 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the media meter 114, the media presentation device 116, the tone analyzer 304, the data segmenter 306, the offset determiner 308, the A/D converter 309, the FFT audio scanner 310, the frequency bins 312, the tone identifier 313, the session identification determiner 314, the session report generator 316, and the panelist identifier 318.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system. In this example, the one or more input devices 1122 implement the audio interface 302 and the DTMF interface 322.

One or more output devices 1124 are also connected to the interface circuit 1120 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip, and/or a graphics driver processor. In this example, the one or more output devices 1124 implement the session report transmitter 319 and the session transmitter 320.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via the network 122. The communication can be via, for example, an Ethernet connection, a digital subscriber line (DSL) connection, a telephone line connection, a coaxial cable system, a satellite system, a line-of-site wireless system, a cellular telephone system, etc. In this example, the media provider 102 and the audience measurement entity 118 are in communication with the network 122.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives. In this example, the one or more mass storage devices 1128 include the tone identification database 214.

The machine executable instructions 1132 of FIGS. 6 and/or 7 may be stored in the mass storage device 1128, in the volatile memory 1114, in the non-volatile memory 1116, and/or on a removable non-transitory computer readable storage medium such as a CD or DVD.

Figure 12:
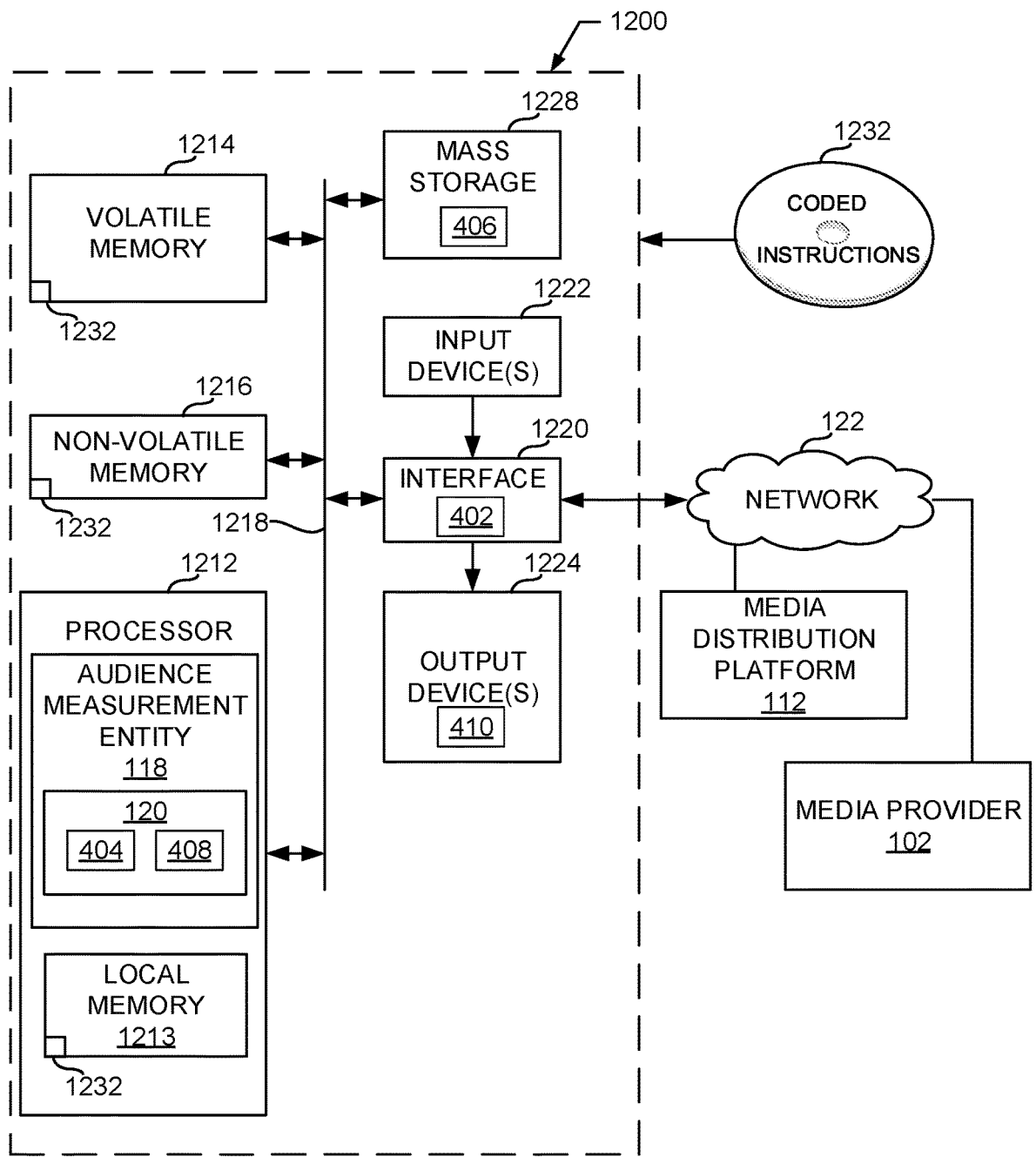
FIG. 12 is a block diagram of an example processing platform structured to execute the instructions of FIG. 7 to implement the example audience measurement entity of FIGS. 1 and/or 4.

FIG. 12 is a block diagram of an example processor platform 1200 structured to execute the instructions of FIG. 8 to implement the audience measurement entity 118 of FIGS. 1 and 4. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the data collection facility 120, the session report analyzer 402, and the session demographics report generator 406.

The processor 1212 of the illustrated example includes a local memory 1213 (e.g., a cache). The processor 1212 of the illustrated example is in communication with a main memory including a volatile memory 1214 and a non-volatile memory 1216 via a bus 1118. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip, and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via the network 122. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 1220 includes the session report interface 402. In this example, the media provider 102 and the media distribution platform 112 are in communication with the network 122.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives. In this example, the one or more mass storage devices 1128 implement the panelist database 406.

The machine executable instructions 1232 of FIG. 8 may be stored in the mass storage device 1228, in the volatile memory 1214, in the non-volatile memory 1216, and/or on a removable non-transitory computer readable storage medium such as a CD or DVD.

Figure 13:
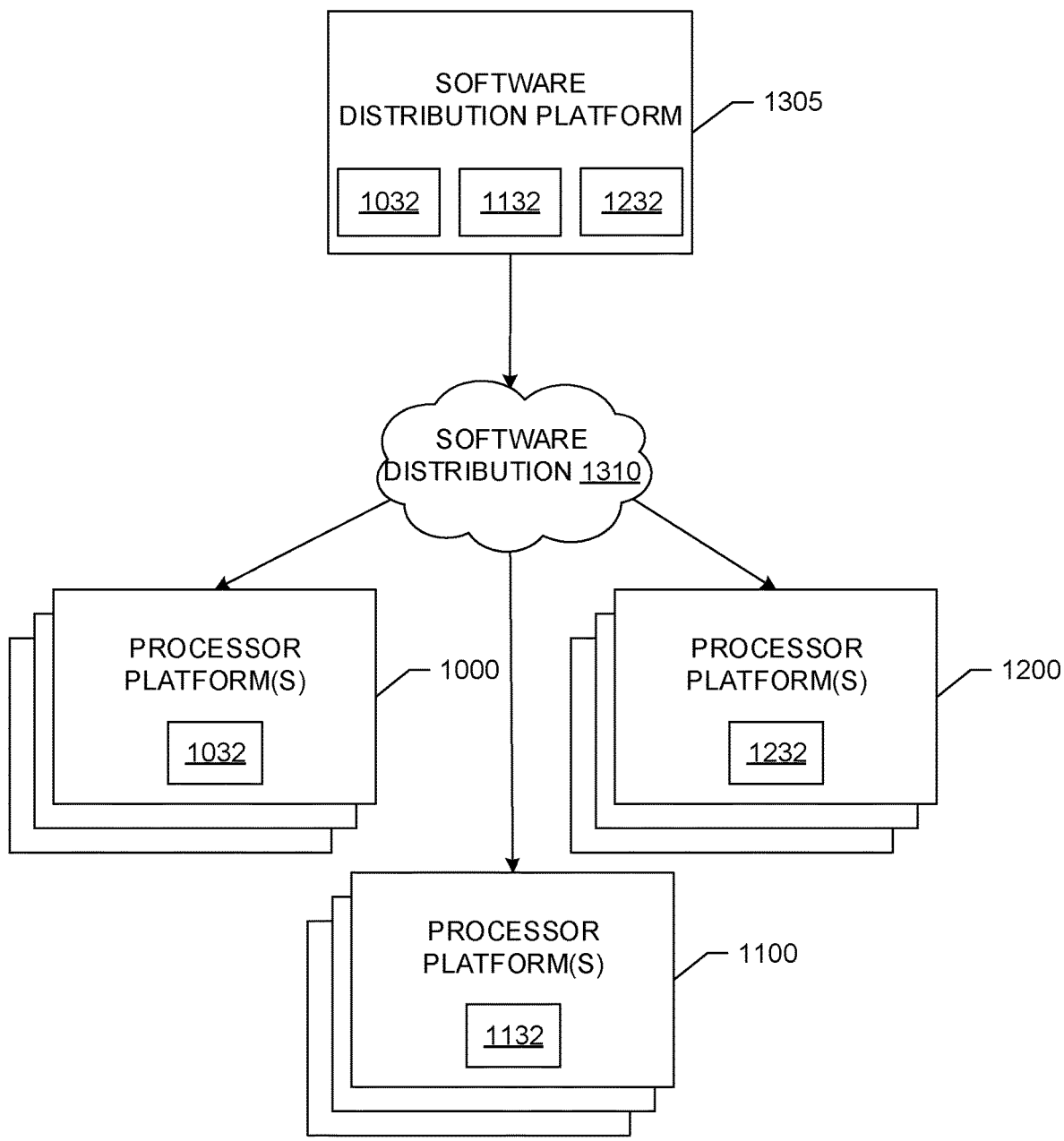
FIG. 13 is a block diagram of an example software distribution platform to distribute software (e.g., software corresponding to the example computer readable instructions of FIGS. 5, 6, 7, and/or 8) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1305 to distribute software such as the example computer readable instructions 1032, 1132, 1232 of FIGS. 10, 11, and 12 to third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1032, 1132, 1232 of FIGS. 10, 11, and 12. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the computer readable instructions 1032, 1132, 1232 which may correspond to the example computer readable instructions 500, 600, 700, 800, 900 of FIGS. 5, 6, 7, 8 and/or 9, as described above. The one or more servers of the example software distribution platform 1305 are in communication with a network 1310, which may correspond to any one or more of the Internet and/or any of the example network 122 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1032, 1132, 1232 from the software distribution platform 1305. For example, the software, which may correspond to the example computer readable instructions 500, 600, 700, 800, 900 of FIGS. 5, 6, 7, 8 and/or 9, may be downloaded to the example processor platform(s) 1000, 1100, 1200 which is to execute the machine-readable instructions 1032, 1132, 1232 to implement the smart television session audience analysis system 100. In some example, one or more servers of the software distribution platform 1305 periodically offer, transmit, and/or force updates to the software (e.g., the example computer readable instructions 1032, 1132, 1232 of FIGS. 10, 11 and/or 12) to ensure improvements, patches, updates, etc. are distributed and applied to the software at the end user devices.

From the foregoing, it will be appreciated that example methods, apparatus and articles of manufacture have been disclosed that identify media application sessions. The disclosed methods, apparatus, and articles of manufacture improve the efficiency of using a computing device by identifying smart television application sessions encountered by a panelist in 1 second or less. Further, the disclosed methods, apparatus, and articles of manufacture determine the smart television application session encountered by the panelist based on an identified DTMF tone(s) associated with the smart television application session and a corresponding identification value. In turn, the disclosed methods, apparatus, and articles of manufacture determine the demographics associated with media encountered during the smart television application sessions based on a panelist identifier associated with the panelist. As such, the disclosed methods, apparatus, and articles of manufacture are accordingly directed to one or more improvement(s) in the functioning of a computer.

Example methods, apparatus, systems, and articles of manufacture to identify media application sessions are disclosed herein. Further examples and combinations thereof include the following:

Example 1 includes an apparatus comprising an audio interface to monitor an audio output of a media presentation device during a viewing session, a tone analyzer to identify one or more dual-tone multi-frequency tones presented by the audio output of the media presentation device, a session identification determiner to determine a session identification value associated with the viewing session based on the one or more dual-tone multi-frequency tones, and a session report generator to associate a panelist identifier with the viewing session, and generate a session report based on the session identification value and the panelist identifier.

Example 2 includes the apparatus of example 1, wherein the session identification value is associated with up to 10 dual-tone multi-frequency tones.

Example 3 includes the apparatus of example 1, wherein the session identification determiner determines the session identification value within one second of the audio output presenting the one or more dual-tone multi-frequency tones.

Example 4 includes the apparatus of example 1, wherein the tone analyzer identifies the dual-tone multi-frequency tones during a beginning portion of the viewing session.

Example 5 includes the apparatus of example 1, further including a tone identification database to store the one or more dual-tone multi-frequency tones and the associated session identification value.

Example 6 includes the apparatus of example 1, wherein the session identification determiner generates a timestamp in response to the tone analyzer identifying the one or more dual-tone multi-frequency tones.

Example 7 includes the apparatus of example 1, wherein the panelist identifier is associated with demographics of a panelist.

Example 8 includes One or more non-transitory computer readable media comprising instructions that, when executed, cause one or more processors to at least monitor an audio output of a media presentation device during a viewing session, identify one or more dual-tone multi-frequency tones presented by the audio output of the media presentation device, determine an identification value associated with the viewing session based on the one or more dual-tone multi-frequency tones, associate a panelist identifier with the viewing session, and generate a session report based on the identification value associated with the one or more dual-tone multi-frequency tones and the panelist identifier.

Example 9 includes the one or more non-transitory computer readable media of example 8, wherein the identification value is associated with up to 10 dual-tone multi-frequency tones.

Example 10 includes the one or more non-transitory computer readable media of example 12, wherein the instructions, when executed, cause the one or more processors to determine the identification value associated with the one or more dual-tone multi-frequency tones within 1 second.

Example 11 includes the one or more non-transitory computer readable media of example 8, wherein the one or more dual-tone multi-frequency tones are identified during a beginning portion of the viewing session.

Example 12 includes the one or more non-transitory computer readable media of example 8, wherein the panelist identifier is associated with demographics of a panelist.

Example 13 includes the one or more non-transitory computer readable media of example 8, wherein the instructions, when executed, cause the one or more processors to generate a timestamp in response to identifying the one or more dual-tone multi-frequency tones.

Example 14 includes an apparatus comprising a non-transitory computer readable medium to store instructions, a processor to execute the instructions stored in the non-transitory computer readable medium to at least monitor an audio output of a media presentation device during a viewing session, identify one or more dual-tone multi-frequency tones presented by the audio output of the media presentation device, determine an identification value associated with the viewing session based on the one or more dual-tone multi-frequency tones, associate a panelist identifier with the viewing session, and generate a session report based on the identification value associated with the one or more dual-tone multi-frequency tones and the panelist identifier.

Example 15 includes the apparatus of example 14, wherein the identification value is associated with up to 10 dual-tone multi-frequency tones.

Example 16 includes the apparatus of example 14, wherein the instructions, when executed, cause the one or more processors to determine the identification value associated with the one or more dual-tone multi-frequency tones within 1 second.

Example 17 includes the apparatus of example 14, wherein the one or more dual-tone multi-frequency tones are identified during a beginning portion of the viewing session.

Example 18 includes the apparatus of example 14, wherein the instructions, when executed, cause the one or more processors to correlate the one or more dual-tone multi-frequency tones with the identification value based on a tone identification database.

Example 19 includes the apparatus of example 14, wherein the panelist identifier is associated with demographics of a panelist.

Example 20 includes the apparatus of example 14, wherein the instructions, when executed, cause the one or more processors to generate a timestamp in response to identifying the one or more dual-tone multi-frequency tones.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   an audio interface to monitor an audio output of a media presentation device during a viewing session;
   a tone analyzer to identify one or more dual-tone multi-frequency tones presented by the audio output of the media presentation device;
   a session identification determiner to determine a session identification value associated with the viewing session based on the one or more dual-tone multi-frequency tones, the viewing session associated with media viewing over a period of time having a start time and an end time at the media presentation device, wherein the session identification value is associated with up to 10 dual-tone multi-frequency tones presented in a 1 second clip, and wherein the session identification determiner determines the session identification value within 1 second of the 1 second clip being presented; and
   a session report generator to:
   associate a panelist identifier with the viewing session; and
   generate a session report based on the session identification value and the panelist identifier.

2. The apparatus of claim 1, wherein the session identification determiner determines the session identification value within one second of the audio output presenting the one or more dual-tone multi-frequency tones.

3. The apparatus of claim 1, wherein the tone analyzer identifies the dual-tone multi-frequency tones during a beginning portion of the viewing session.

4. The apparatus of claim 1, further including a tone identification database to store the one or more dual-tone multi-frequency tones linked to the associated session identification value.

5. The apparatus of claim 1, wherein the session identification determiner generates a timestamp in response to the tone analyzer identifying the one or more dual-tone multi-frequency tones.

6. The apparatus of claim 1, wherein the panelist identifier is associated with demographics of a panelist.

7. One or more non-transitory computer readable media comprising instructions that, when executed, cause one or more processors to at least:
   monitor an audio output of a media presentation device during a viewing session;
   identify one or more dual-tone multi-frequency tones presented by the audio output of the media presentation device;
   determine a session identification value associated with the viewing session based on the one or more dual-tone multi-frequency tones within one second of the audio output presenting the one or more dual-tone multi-frequency tones, the viewing session associated with media viewing over a period of time having a start time and an end time at the media presentation device, wherein the session identification value is associated with up to 10 dual-tone multi-frequency tones presented in a 1 second clip, and wherein the session identification value is determined within 1 second of the 1 second clip being presented;
   associate a panelist identifier with the viewing session; and
   generate a session report based on the session identification value associated with the one or more dual-tone multi-frequency tones and the panelist identifier.

8. The one or more non-transitory computer readable media of claim 7, wherein the one or more dual-tone multi-frequency tones are identified during a beginning portion of the viewing session.

9. The one or more non-transitory computer readable media of claim 7, wherein the panelist identifier is associated with demographics of a panelist.

10. The one or more non-transitory computer readable media of claim 7, wherein the instructions, when executed, cause the one or more processors to generate a timestamp in response to identifying the one or more dual-tone multi-frequency tones.

11. An apparatus comprising:
    a non-transitory computer readable medium to store instructions; and
    a processor to execute the instructions stored in the non-transitory computer readable medium to at least:
    monitor an audio output of a media presentation device during a viewing session;
    identify one or more dual-tone multi-frequency tones presented by the audio output of the media presentation device within one second of a start of the viewing session;
    determine a session identification value associated with the viewing session based on the one or more dual-tone multi-frequency tones within one second of the audio output presenting the one or more dual-tone multi-frequency tones, the viewing session associated with media viewing over a period of time having a start time and an end time at the media presentation device, wherein the session identification value is associated with up to 10 dual-tone multi-frequency tones presented in a 1 second clip, and wherein the session identification value is determined within 1 second of the 1 second clip being presented;

associate a panelist identifier with the viewing session; and generate a session report based on the session identification value associated with the one or more dual-tone multi-frequency tones and the panelist identifier.

12. The apparatus of claim 11, wherein the instructions, when executed, cause the processor to determine the session identification value associated with the one or more dual-tone multi-frequency tones within 1 second.

13. The apparatus of claim 11, wherein the one or more dual tone multi-frequency tones are identified during a presentation of the media associated with the viewing session.

14. The apparatus of claim 11, wherein the instructions, when executed, cause the processor to correlate the one or more dual-tone multi-frequency tones with the session identification value based on a tone identification database.

15. The apparatus of claim 11, wherein the panelist identifier is associated with demographics of a panelist.

16. The apparatus of claim 11, wherein the instructions, when executed, cause the processor to generate a timestamp in response to identifying the one or more dual-tone multi-frequency tones.

17. The apparatus of claim 1, wherein the session identification value is separate from the one or more dual-tone multi-frequency tones.

18. The apparatus of claim 1, wherein the session identification value is associated with the media that is visually presented by the media presentation device during the viewing session.

19. The one or more non-transitory computer readable media of claim 7, wherein to determine the session identification value, the instructions, when executed, cause the one or more processors to correlate the one or more dual-tone multi-frequency tones with the session identification value.

20. The apparatus of claim 11, wherein the panelist identifier is indicative of a viewer in the viewing session.

21. The apparatus of claim 1, wherein the one or more dual-tone multi-frequency tones are transmitted to the media presentation device with media to be presented during the viewing session.

* * * * *